(12) United States Patent
Shimada et al.

(10) Patent No.: US 12,656,974 B2
(45) Date of Patent: Jun. 16, 2026

(54) MEMORY SYSTEM AND METHOD OF ESTIMATING READ VOLTAGES THEREOF

(71) Applicant: Kioxia Corporation, Tokyo (JP)

(72) Inventors: Katsuyuki Shimada, Ota Tokyo (JP); Yuki Komatsu, Yokohama Kanagawa (JP); Yasuyuki Ushijima, Yokohama Kanagawa (JP)

(73) Assignee: Kioxia Corporation, Tokyo (JP)

( * ) Notice: Subject to any disclaimer, the term of this patent is extended or adjusted under 35 U.S.C. 154(b) by 43 days.

(21) Appl. No.: 18/590,576

(22) Filed: Feb. 28, 2024

(65) Prior Publication Data

US 2024/0319907 A1 Sep. 26, 2024

(30) Foreign Application Priority Data

Mar. 22, 2023 (JP) ................................. 2023-045538

(51) Int. Cl.
*G06F 3/06* (2006.01)
(52) U.S. Cl.
CPC .......... *G06F 3/0655* (2013.01); *G06F 3/0604* (2013.01); *G06F 3/0679* (2013.01)
(58) Field of Classification Search
CPC .............................. G06F 3/0604; G06F 3/0679
See application file for complete search history.

(56) References Cited

U.S. PATENT DOCUMENTS

| | | | |
|---|---|---|---|
| 8,839,073 B2 | 9/2014 | Cohen | |
| 9,069,659 B1 | 6/2015 | Sabbag et al. | |
| 10,957,400 B1 | 3/2021 | Horisaki et al. | |
| 11,086,569 B2 | 8/2021 | Ng et al. | |
| 2017/0125089 A1* | 5/2017 | Sankaranarayanan ... | G11C 7/14 |
| 2019/0304550 A1* | 10/2019 | Shen .................. | G11C 16/3418 |

FOREIGN PATENT DOCUMENTS

| | | |
|---|---|---|
| JP | 2014154169 A | 8/2014 |
| JP | 2020144958 A | 9/2020 |
| JP | 2021044034 A | 3/2021 |

* cited by examiner

*Primary Examiner* — Nicholas A. Paperno
(74) *Attorney, Agent, or Firm* — Kim & Stewart LLP

(57) ABSTRACT

A memory system includes a nonvolatile memory including a plurality of memory cells, and a controller. The controller is configured to perform a read operation to determine a value of multi-bit data stored in each of the memory cells by using a first plurality of read voltages, and perform an estimation of optimum values of the read voltages. The estimation is performed by applying a second plurality of read voltages to the memory cells and obtaining a first string of bit counts. The estimation is performed further by obtaining a second string of differential bit counts, each of which indicates a difference between adjacent bit counts in the first string of bit counts, extracting a part of the differential bit counts from the second string, and estimating the optimum values of the read voltages using the extracted differential bit counts.

20 Claims, 15 Drawing Sheets

*FIG. 1*

FIG. 4
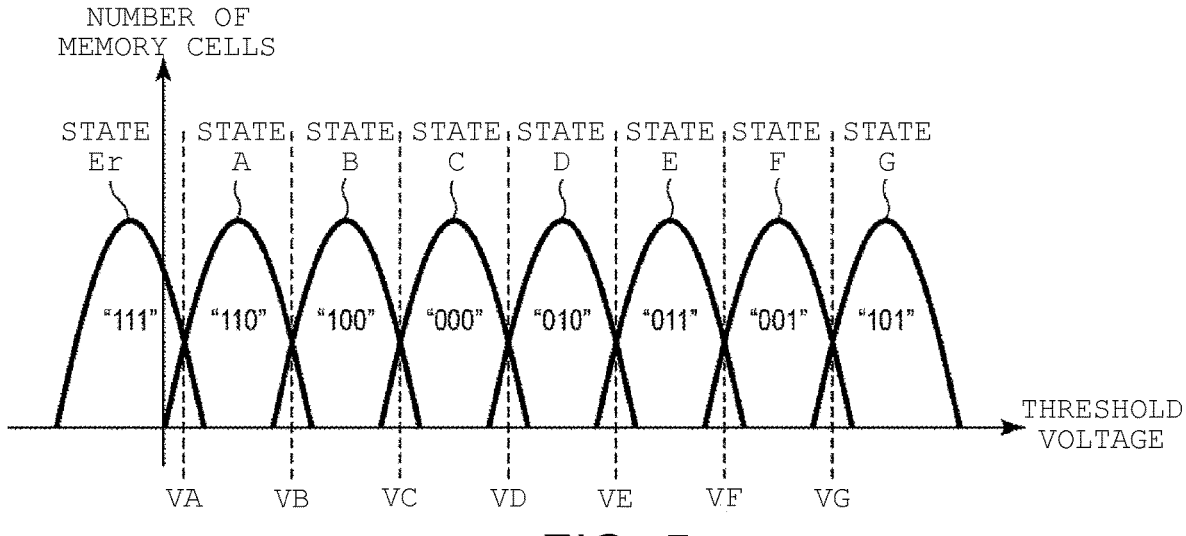
FIG. 5
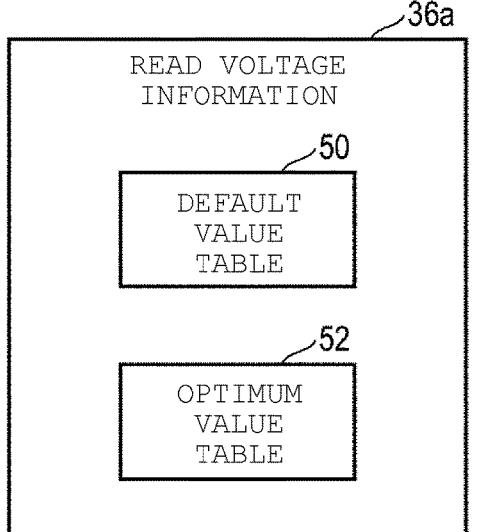
FIG. 6
DEFAULT VALUE TABLE 50
| VOLTAGE | VA | VB | VC | VD | VE | VF | VG |
|---|---|---|---|---|---|---|---|
| DEFAULT VALUE | VA0 | VB0 | VC0 | VD0 | VE0 | VF0 | VG0 |

OPTIMUM VALUE TABLE 52

| VOLTAGE | VA | VB | VC | VD | VE | VF | VG |
|---|---|---|---|---|---|---|---|
| OPTIMUM VALUE | VAs | VBs | VCs | VDs | VEs | VFs | VGs |

28a

OPTIMUM VOLTAGE ESTIMATION MODULE

REFERENCE READ EXECUTION UNIT ~60

REFERENCE READ RESULT PROCESSING UNIT ~62

DIFFERENTIAL BIT COUNT STRING EXTRACTION UNIT ~64

ESTIMATOR ~38

START

EXECUTE REFERENCE READ ～S12

OBTAIN DIFFERENTIAL
BIT COUNT STRING ～S14

EXTRACT DIFFERENTIAL BIT COUNT
STRING ～S16

ESTIMATE OPTIMUM VALUE BASED
ON EXTRACTED DIFFERENTIAL BIT
COUNT STRING ～S18

END

DIFFERE
-NTIAL
BIT
COUNT

READ
VOLTAGE

DIFFERE
-NTIAL
BIT
COUNT

READ
VOLTAGE

NUMBER OF
MEMORY CELLS

READ
VOLTAGE

DIFFERENTIAL
BIT COUNT

EXTRACTION
RANGE

READ
VOLTAGE

BIT COUNT

7/8
6/8
5/8
4/8
3/8
2/8
1/8

READ
VOLTAGE

MEMORY SYSTEM AND METHOD OF ESTIMATING READ VOLTAGES THEREOF

CROSS-REFERENCE TO RELATED APPLICATION

This application is based upon and claims the benefit of priority from Japanese Patent Application No. 2023-045538, filed Mar. 22, 2023, the entire contents of which are incorporated herein by reference.

FIELD

Embodiments described herein relate generally to a memory system and a method of estimating read voltages thereof.

BACKGROUND

A memory system includes a memory device having a plurality of memory cells. When reading data from the memory device, a read voltage is applied to a word line connected to the memory cell to be read. When the read voltage is not appropriate, errors in read data will increase. In this case, error correction and retry reading are performed, which increases latency and degrades read performance.

BRIEF DESCRIPTION OF THE DRAWINGS

FIG. 1 is a block diagram illustrating an example of an information processing system including a memory system according to an embodiment;

FIG. 4 is a diagram illustrating an example of a threshold voltage distribution of a multilevel memory cell according to the embodiment;

FIG. 5 is a diagram illustrating an example of read voltage information according to the embodiment;

FIG. 6 is a diagram illustrating an example of a default value table in read voltage information according to the embodiment;

DETAILED DESCRIPTION

Figure 2:
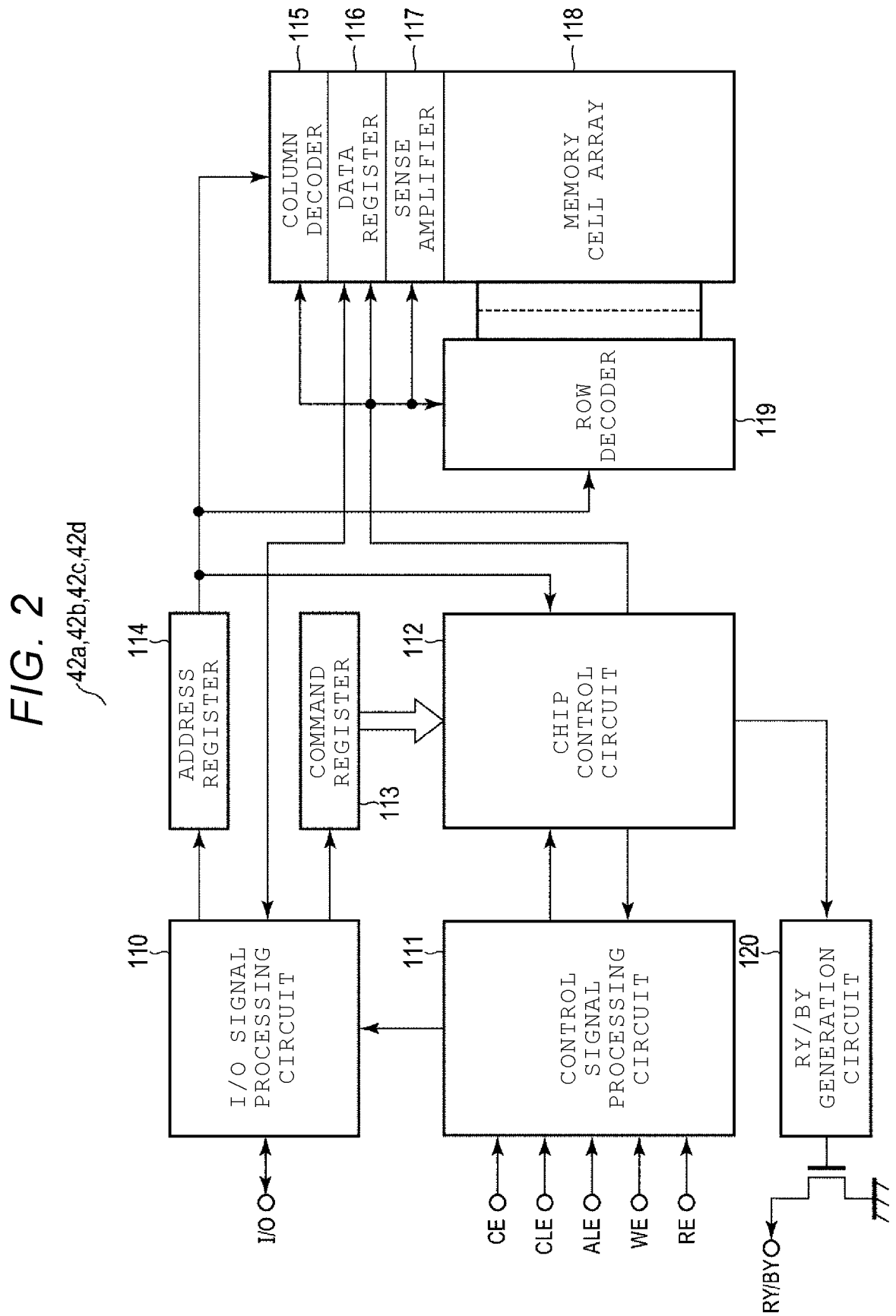
FIG. 2 is a block diagram illustrating an example of a memory chip in the memory system according to the embodiment.

Embodiments provide a memory system and a method that can improve read performance.

In general, according to an embodiment, a memory system comprises a nonvolatile memory including a plurality of memory cells, and a controller. The controller is configured to perform a read operation to determine a value of multi-bit data stored in each of the memory cells by using a first plurality of read voltages, and perform an estimation of optimum values of the read voltages. The estimation is performed by applying a second plurality of read voltages to the plurality of memory cells and obtaining a first string of bit counts. The number of read voltages in the second plurality is greater than the number of read voltages in the first plurality and each of the bit counts indicates a number of memory cells that are turned on when a corresponding one of the read voltages in the second plurality is applied to the plurality of memory cells. The estimation is performed further by obtaining a second string of differential bit counts, each of which indicates a difference between adjacent bit counts in the first string of bit counts, extracting a part of the differential bit counts from the second string, and estimating the optimum values of the read voltages using the extracted differential bit counts.

Hereinafter, embodiments will be described with reference to the drawings. The following description exemplifies devices and methods for implementing the technical idea of the embodiments, and the technical idea of the embodiments is not limited to the structure, shape, arrangement, material, and the like of components described below. Modifications that can be easily conceived by those skilled in the art are naturally included within the of the disclosure. In order to make the description clearer, in the drawings, the size, thickness, planar dimension, shape, and the like of each element may be changed from the actual embodiment and schematically expressed. A plurality of drawings may include elements having different dimensional relationships and ratios. In a plurality of drawings, corresponding elements may be designated by the same reference numerals and redundant descriptions may be omitted. Although some elements may be given multiple names, these names are merely examples, and do not deny that other names may be given to these elements. Furthermore, this does not negate the use of other names for elements that are not given multiple names. In the following description, "connection" may include not only direct connection but also connection via other elements.

Before describing the embodiments, definitions of terms will be explained.

(Data Read)

This is a process of reading (read) data written in a memory. This is a read performed for one read unit of the memory. An example of the one read unit of the memory is a row of a plurality of multilevel memory cells.

(Reference Read)

This is a process in which a plurality of different voltages is applied to one read unit of the memory in order to obtain information on a threshold voltage distribution of the multilevel memory cell, and a bit count is obtained for each. Instead of the plurality of different voltages, one voltage may be applied. In that case, by adding 0 to the beginning, a bit count string and a differential bit count string of length 1 can be obtained. The reference read is a read that is performed as pre-processing for estimating the threshold voltage during reading.

(Bit Count)

This is a count of the number of memory cells that are turned on when a read is performed in one read unit using a certain read voltage. Depending on the implementation, this may be a count of the number of memory cells that are turned off.

(Differential Bit Count)

This is a difference between two adjacent bit counts in a bit count string that is a set of bit counts for a plurality of different voltages.

(Error Bit Count)

This is a bit count that is read as an incorrect value due to a disturbance in the threshold voltage distribution during data reading. Disturbances in the threshold voltage distribution occur due to fluctuations in the amount of charge stored in the multilevel memory cell after data is written. This is the sum of the number of cells that should have been turned on but detected as off, and the number of cells that should have been turned off but detected as on. When the error bit count becomes large, correct data may not be decoded.

(Optimal Read Voltage)

This is a read voltage that minimizes the error bit count when reading data. It may be simply referred to as the optimal value.

(State)

This refers to a state of the multilevel memory cell. In a multilevel memory in which one memory cell stores 3-bit data, the memory cell can take eight states.

First Embodiment

Figure 1:
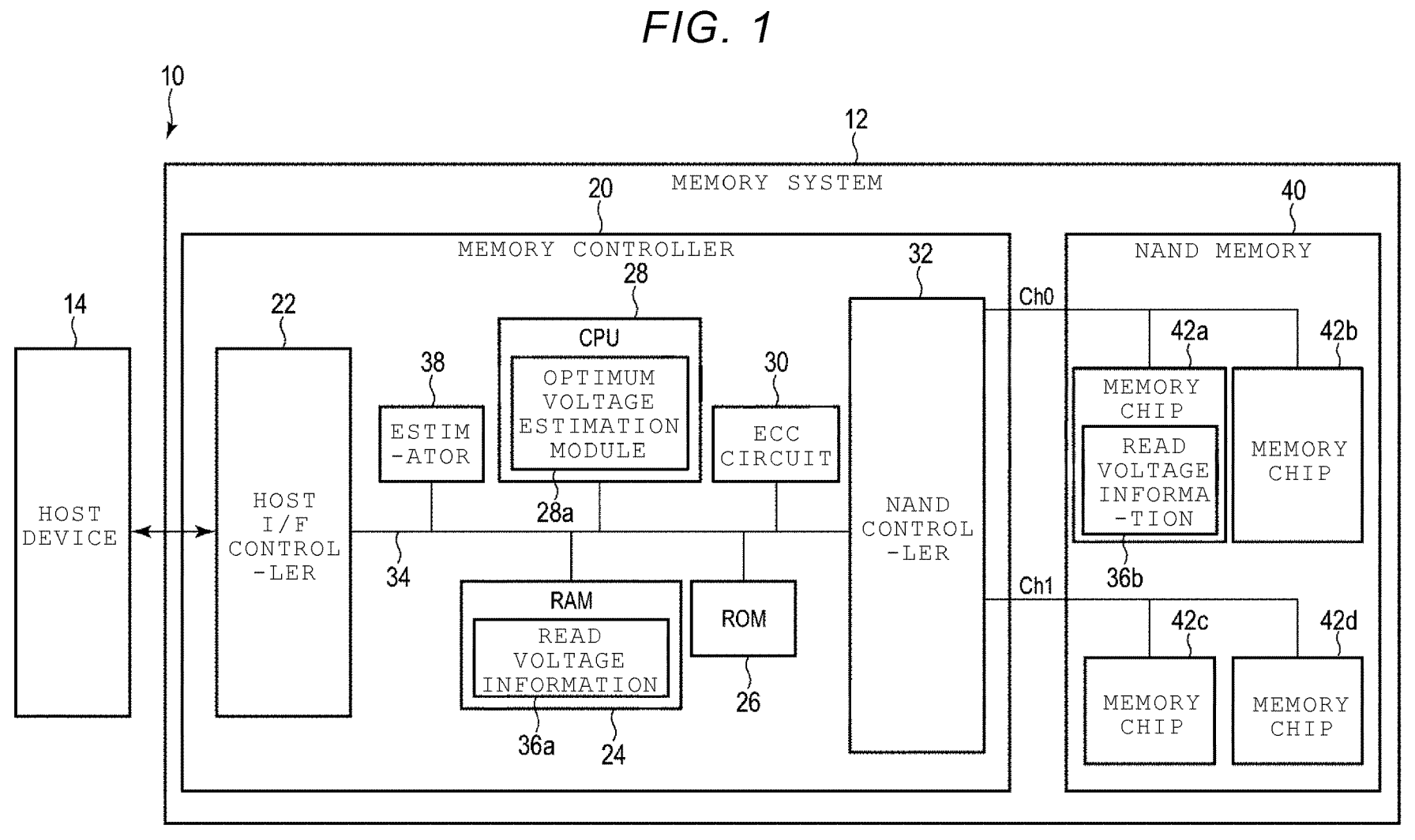

FIG. 1 is a block diagram illustrating an example of an information processing system 10 including a memory system according to a first embodiment. The information processing system 10 includes a host device 14 and a memory system 12. The memory system 12 is capable of being connected to the host device 14 via a cable, connector, socket, or network. The memory system 12 may be mounted on a printed wiring board of the host device 14 via, for example, solder balls.

The host device 14 is an information processing device configured to control the memory system 12. The host device 14 may be, for example, a server device, a personal computer, a vehicle-mounted device, or a mobile information processing device. The host device 14 can issue access requests to the memory system 12. Access requests include read requests and write requests. In this specification, reading is also referred to as read, and writing is also referred to as write.

The memory system 12 includes a memory controller 20 and a NAND flash memory (hereinafter referred to as NAND memory) 40. The memory system 12 is, for example, a solid state drive (SSD) or a universal flash storage (UFS) device. The NAND memory 40 is an example of a nonvolatile memory. Other types of nonvolatile memories may be used instead of the NAND memory 40. The other types of the nonvolatile memory include a NOR flash memory, a magneto-resistive random access memory (MRAM), a phase change random access memory (PRAM), a resistive random access memory (ReRAM), and a ferroelectric random access memory (FeRAM).

The memory controller 20 includes a host device interface controller (host I/F controller) 22, a random access memory (RAM) 24, a read only memory (ROM) 26, a central processing unit (CPU) 28, an error correcting code (ECC) circuit 30, a NAND controller 32, and an estimator 38. The host device I/F controller 22, the RAM 24, the ROM 26, the CPU 28, the ECC circuit 30, the NAND controller 32, and the estimator 38 are connected to a bus 34. The memory controller 20 may be configured as a system on a chip (SoC) in which the above-described components are integrated into one chip. Some of these components may be provided outside the memory controller 20.

The host I/F controller 22 controls a communication interface between the host device 14 and the memory system 12 and controls data transfer between the host device 14 and the RAM 24 under the control of the CPU 28. Examples of the communication interface between the host device 14 and the memory system 12 are small computer system interface (SCSI), serial attached SCSI (SAS), AT attachment (ATA), serial ATA (SATA), PCI express (PCIe)™, Ethernet™, Fibre channel, NVM express (NVMe)™, universal serial bus (USB)™, and universal asynchronous receiver/transmitter (UART)™.

Examples of the RAM 24 include, but are not limited to, a dynamic random access memory (DRAM) and a static random access memory (SRAM).

The RAM 24 functions as a buffer for data transfer between the host device 14 and the NAND memory 40. The RAM 24 provides a work area for the CPU 28. A firmware (program) stored in the ROM 26 is loaded into the RAM 24 when the memory system 12 operates.

In the present embodiment, when the memory system 12 operates, read voltage information 36b is read from the NAND memory 40 and stored in the RAM 24 as read voltage information 36a. The read voltage information 36a relates to the read voltages when reading the NAND memory 40. When the power of the memory system 12 is turned off, the read voltage information 36a is stored in the NAND memory 40 as the read voltage information 36b and is made nonvolatile. Details of the read voltage information 36a will be described below.

The CPU 28 is an example of a hardware processor. The CPU 28 controls the memory controller 20 by executing the firmware loaded into the RAM 24. The CPU 28 controls operations such as data write, read, and erase, which will be described below. Further, the CPU 28 includes an optimal voltage estimation module 28a implemented by executing firmware. A plurality of CPUs 28 may be provided for each operation.

The ECC circuit 30 encodes data to be written (also referred to as write data) to the NAND memory 40 for error correction. The ECC circuit 30 detects errors in data read from the NAND memory 40 (also referred to as read data). When the data read from the NAND memory 40 contains an error, the ECC circuit 30 performs error correction on the read data based on an error correction code given at the time of writing.

The NAND controller 32 controls data transfer between the RAM 24 and the NAND memory 40 under the control of the CPU 28. Examples of standards used for data transfer between the NAND controller 32 and the NAND memory 40 are Toggle DDR or Open NAND Flash Interface (ONFI).

The memory controller 20 and the NAND memory 40 are connected through a plurality of channels, for example, two channels Ch0 and Ch1. The number of channels is not limited to a plurality of channels and may be one. Further, in the case of a plurality of channels, the number of channels may be three or more. The NAND controller 32 controls data transfer via the channels Ch0 and Ch1.

The NAND memory 40 has a plurality of, for example four, memory chips 42a, 42b, 42c, and 42d. Two memory chips 42a and 42b are connected to the channel Ch0. Two memory chips 42c and 42d are connected to the channel Ch1. Three or more memory chips may be connected to each channel.

The optimal voltage estimation module 28a estimates optimal values of the read voltages used when reading data from the NAND memory 40 during operation of the memory system 12 and updates the read voltage information 36a based on the estimated optimal value.

The estimator 38 is a hardware module used to speed up estimation of the optimal values by the optimal voltage estimation module 28a. An example of the estimator 38 is an arithmetic circuit that performs matrix operations in a deep learning neural network (DNN). DNN parameters may be stored in the ROM 26. However, the memory controller 20 may not include the estimator 38 but may include an estimation module implemented by executing firmware in the CPU 28, or the optimal voltage estimation module 28a may have the function of the estimator 38.

FIG. 2 is a block diagram illustrating an example of the memory chip 42a. Other memory chips 42b, 42c, and 42d are similarly configured.

The memory chip 42a includes an input/output signal processing circuit (I/O signal processing circuit) 110, a control signal processing circuit 111, a chip control circuit 112, a command register 113, an address register 114, a ready/busy (RY/BY) generation circuit 120, a memory cell array 118, a column decoder 115, a data register 116, a sense amplifier 117, and a row decoder 119.

The channel Ch0 connecting the memory chip 42a and the NAND controller 32 includes an input/output (I/O) signal line, a control signal line, and a ready/busy (RY/BY) signal line. The I/O signal line is connected to the I/O signal processing circuit 110. The I/O signal line transmits data, addresses, various instructions, and various responses. The memory controller 20 transmits a read instruction, a write instruction, and an erase instruction to the memory chip 42a via the I/O signal line.

The control signal line includes a chip enable (CE) signal line, a command latch enable (CLE) signal line, an address latch enable (ALE) signal line, a write enable (WE) signal line, a read enable (RE) signal line, and the like. The control signal line is connected to the control signal processing circuit 111. The CE signal line transmits a signal indicating whether the target memory chip is being selected. The CLE signal line transfers a signal indicating whether the signal sent using the I/O signal line is a command. The ALE signal line transfers a signal indicating whether the signal sent using the I/O signal line is an address. The WE signal line transmits a signal for causing the memory chip 42a to take in the signal on the I/O signal line. The RE signal line transmits a signal for outputting a signal from the memory chip 42a to the I/O signal line.

The RY/BY signal line is connected to the RY/BY generation circuit 120. The RY/BY signal line transmits a signal indicating whether the NAND memory 40 is in operation. For example, the signal transmitted through the RY/BY signal line indicates a ready state (RY) corresponding to a non-operating state at a logic value H level, and a busy state (BY) corresponding to an operating state at a logic value L level.

The I/O signal processing circuit 110 is a buffer circuit for transmitting and receiving I/O signals between the memory chip 42a and the NAND controller 32. The commands latched by the I/O signal processing circuit 110 are distributed and stored in the command register 113. The address specifying an access destination latched by the I/O signal processing circuit 110 is distributed and stored in the address register 114. The data latched by the I/O signal processing circuit 110 is distributed and stored in the data register 116. The I/O signal processing circuit 110 receives data from the data register 116.

The address stored in the address register 114 includes a chip number, a row address, and a column address. The chip number is identification information for specifying the memory chip 42a. The chip number, row address, and column address are read out to the chip control circuit 112, row decoder 119, and column decoder 115, respectively.

The control signal processing circuit 111 receives a control signal, and based on the received control signal, allocates a register of a storage destination of the I/O signal received by the I/O signal processing circuit 110. Further, the control signal processing circuit 111 transfers the received control signal to the chip control circuit 112.

The chip control circuit 112 is a circuit that transitions state based on various control signals received via the control signal processing circuit 111. The chip control circuit 112 controls the operation of the memory chip 42a. The RY/BY generation circuit 120 transitions the state of the signal transmitted on the RY/BY signal line between the ready state (RY) and the busy state (BY) under the control of the chip control circuit 112.

The sense amplifier 117 senses a state of a memory cell MT (see FIG. 3) in the memory cell array 118 in the read, and generates read data based on the sensed state. The sense amplifier 117 stores the generated read data in the data register 116. The read data stored in the data register 116 is sent to the I/O signal processing circuit 110 through a data line and transferred from the I/O signal processing circuit 110 to the memory controller 20.

The memory cell array 118 has a plurality of memory cells MT that store data. The memory cell array 118 has a plurality of physical blocks BLK (see FIG. 3). Each physical block BLK is a memory cell group including a plurality of memory cells MT. The physical block BLK is the minimum unit of data erase. That is, all data stored in one physical block BLK is erased all at once. In the following, physical blocks are simply referred to as blocks.

Figure 3:
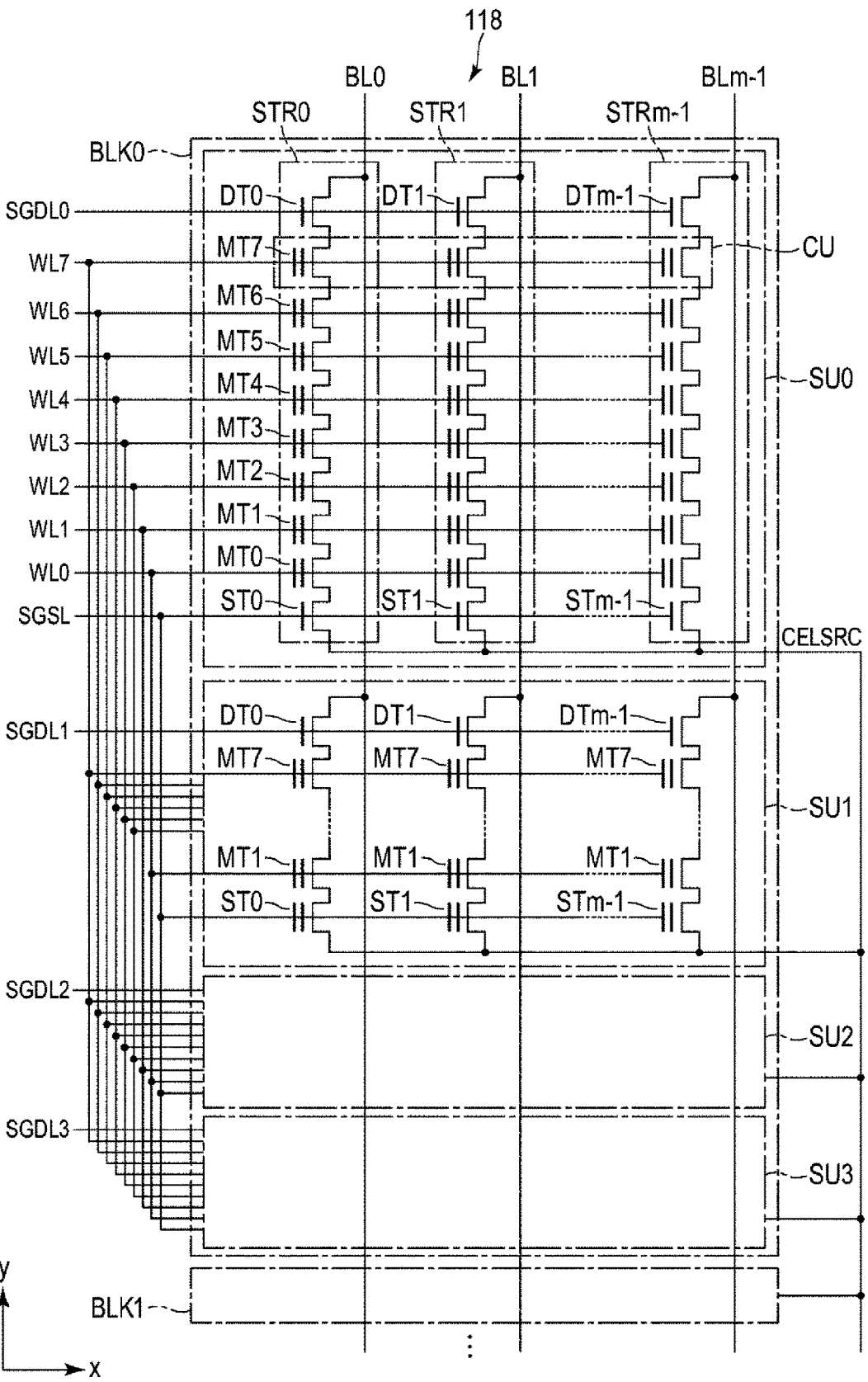
FIG. 3 is a circuit diagram illustrating an example of a memory cell array of the memory chip according to the embodiment.

FIG. 3 is a circuit diagram illustrating an example of the memory cell array 118. The memory cell array 118 has a plurality of blocks BLK0, BLK1, . . . . The memory cell array 118 has hundreds to thousands of blocks BLK. The memory cell array 118 is, for example, a so-called three-dimensional NAND memory in which a plurality of memory cells MT are arranged in a three-dimensional manner. The structure of NAND memory is not limited to a three-dimensional structure. The memory cell array 118 may be a so-called two-dimensional NAND memory in which a plurality of memory cells MT are arranged in a plane.

As illustrated in FIG. 3, respective m bit lines BL0 to BLm-1 are connected to a plurality of strings, for example, four strings STR, in the blocks BLK0, BLK1, . . . m is an integer of 2 or more. The string STR includes one first select gate transistor ST (ST0 or ST1 to STm-1), a plurality of memory cells MT (MT0 to MT7), and one second select gate transistor DT (DT0 or DT1 to DTm-1). The first select gate transistor ST0 (or ST1 to STm-1), the plurality of memory cells MT0 to MT7, and one second select gate transistor DT0 (or DT1 to DTm-1) are each connected in series between a source line CELSRC and one bit line BL0 (or BL1 to BLm-1) in this order. The m strings STR0 to STRm-1 are respectively connected to different bit lines BL0 to BLm-1. The m strings STR0 to STRm-1 connected to a common second select gate line (drain side select gate line) SGDL form one string unit SU. Each block BLK0, BLK1, . . . includes a plurality of string units, for example, four string units SU0 to SU3. Common word lines WL0 to WL7 and a common first select gate line (source side select gate line) SGSL are connected to each of the four string units SU0 to SU3.

In each of the string units SU0 to SU3, control gate electrodes of the first select gate transistors ST0 to STm-1 are connected to the common first select gate line (source side select gate line) SGSL. The first select gate line SGSL is a signal line that controls the control gate electrodes of the first select gate transistors ST0 to STm-1. The first select gate transistors ST0 to STm-1 selectively connect the plurality of memory cells MT0 to MT7 and the source line CELSRC based on the voltage applied through the first select gate line SGSL. Four different first select gate lines SGSL may be respectively connected to the string units SU0 to SU3.

In each of the string units SU0 to SU3, the control gate electrodes of the second select gate transistors DT0 to DTm-1 are connected to each of corresponding second select gate lines (drain side select gate lines) SGDL0 to SGDL3. The second select gate lines SGDL0 to SDGL3 are signal lines each of which controls the control gate electrodes of the corresponding second select gate transistors DT0 to DTm-1. The second select gate transistors DT0 to DTm-1 selectively connect the plurality of memory cells MT0 to MT7 and the bit lines BL0 to BLm-1 based on voltages respectively applied through the corresponding second select gate lines SGDL0 to SGDL3.

The memory cell MT is configured with a metal oxide semiconductor field effect transistor (MOSFET) having a stacked gate structure. The stacked gate structure includes a floating gate formed with a tunnel oxide film interposed therebetween, and a control gate electrode formed on the floating gate with a gate insulating film interposed therebetween. A threshold voltage of the memory cell MT changes depending on the number of charges (amount of charges) stored in the floating gate. In the memory cell MT, positive charges are injected into the floating gate during writing, and positive charges are extracted from the floating gate during erasing. Any one of two or more data values can be written into the memory cell MT. The memory cell MT stores one of two or more data values in a nonvolatile manner depending on the difference in threshold voltage.

In each block BLK0, BLK1, . . . , the control gate electrodes of the memory cell MT0 to MT7 are respectively connected to the corresponding word lines WL0 to W7. The word lines WL0 to WL7 are control signal lines for selecting one row of memory cells MT lined up in the X direction in the memory cell array 118. The word lines WL0 to WL7 are commonly connected to a group of memory cells MT arranged in one row. The memory cells MT0 to MT7 are provided at the intersections of the word lines WL0 to WL7 and the bit lines BL0 to BLm-1. By applying a read voltage or a write voltage to the word line WL (hereinafter, also referred to as a selected word line WL) connected to the memory cell MT to be read or written, reading or writing with respect to the memory cell MT becomes possible.

In each block BLK0, BLK1, . . . , the word lines WL0 to WL7 corresponding to the same address are commonly connected to the memory cells MT0 to MT7 of four string units SU0 to SU3. In one string unit SU, a set of a plurality of memory cells MT sharing one word line WL is called a cell unit CU. Data is written into the plurality of memory cells MT in one cell unit CU at once, and data is read out at once. A storage area of one cell unit CU includes one or more pages.

In the memory system 12, each memory cell MT may be configured to be able to store a single-bit or multiple-bit value. A memory cell MT in which data of multiple bits are stored is called a multilevel memory cell. When each memory cell MT is capable of storing n-bit values, the storage capacity per word line WL is equal to the size of n pages. n is an integer of 1 or more. Here, as an example, a case will be described in which the memory cell MT operates in a triple level cell (TLC) mode in which a 3-bit value is stored. An operation mode in which the memory cell MT stores a 1-bit value is called the single-level cell (SLC) mode, an operation mode in which the memory cell MT stores a 2-bit value is called the multi-level cell (MLC) mode, and an operation mode in which the memory cell MT stores a 4-bit value is called a quad level cell (QLC) mode. The embodiment is also applicable to an operation mode in which the memory cell MT stores a value of 5 bits or more.

In the TLC mode, three pages of data can be stored in one cell unit CU. Among the three pages configured with one cell unit CU, a page written first is called a lower page, a page written after the lower page is called a middle page, and a page written after the middle page is called an upper page. There may be a mode in which a program (that is, writing) is executed on some or all of a plurality of pages configured with one cell unit CU at once.

FIG. 4 is a diagram illustrating an example of a threshold voltage distribution of a multilevel memory cell. In the following description, it is assumed that the memory cells in the memory cell array 118 are multilevel memory cells that operate in the TLC mode. In FIG. 4, a horizontal axis represents a threshold voltage of a memory cell, and a vertical axis represents the number of memory cells that exhibit a certain bit value (data value). The threshold voltage of a memory cell has a value depending on the data stored in the memory cell. When the memory cell operates in the TLC mode, the threshold voltage of the memory cell includes eight distributions. The threshold voltage corresponds to the amount of charge stored in the memory cell, and the memory cell stores data according to the amount of charge. That is, the threshold voltage distribution indicates the state of the memory cell. Hereinafter, the threshold voltage distribution will also be referred to as a state.

A memory cell operating in the TLC mode can store octonary data (i.e., three-bit data) xyz defined by data x belonging to an upper page, data y belonging to a middle page, and data z belonging to a lower page. The values of data x, data y, and data z are "0" or "1".

The threshold voltage of the memory cell is controlled to belong to one of eight states. The correspondence between the state and the data value of the octonary data xyz is determined in advance. Each state is assigned a data value as shown in FIG. 4. The correspondence between states and data values is not limited to the above.

For example, the data value "111" is assigned to a state Er in the lowest threshold voltage range. The data value "110" is assigned to a state A of the second lowest threshold voltage range. The data value "100" is assigned to the third lowest threshold voltage state B. The data value "000" is assigned to the fourth lowest threshold voltage state C. The data value "010" is assigned to the fifth lowest threshold voltage state D. The data value "011" is assigned to the sixth lowest threshold voltage state E. The data value "001" is assigned to the seventh lowest (second highest) threshold voltage state F. The data value "101" is assigned to the highest threshold voltage state G.

The threshold voltage that distinguishes whether the state of the memory cell is at the state Er or state A is called voltage A (VA). The threshold voltage that distinguishes whether the state of the memory cell is at the state A or state B is called voltage B (VB). The threshold voltage that distinguishes whether the state of the memory cell is at the state B or state C is called voltage C (VC). The threshold voltage that distinguishes whether the state of the memory cell is at the state C or state D is called voltage D (VD). The threshold voltage that distinguishes whether the state of the memory cell is at the state D or state E is called voltage E (VE). The threshold voltage that distinguishes whether the state of the memory cell is at the state E or state F is called voltage F (VF). The threshold voltage that distinguishes whether the state of the memory cell is at the state F or state G is called voltage G (VG).

The row decoder 119, column decoder 115, data register 116, and sense amplifier 117 of the NAND memory 40 will be additionally described using FIG. 2 as well. The row decoder 119, column decoder 115, data register 116, and sense amplifier 117 are part of the peripheral circuitry for the memory cell array 118. The peripheral circuitry performs read, write, and erase accesses to the memory cell array 118 under the control of the chip control circuit 112.

In writing, the column decoder 115 selects and activates the bit line BL corresponding to the column address. The sense amplifier 117 sets the potential of the bit line BL selected by the column decoder 115 to 0 volts. The row decoder 119 applies a programming pulse to the selected word line WL corresponding to the row address. An example of the programming pulse is a pulse that gradually increases in voltage with each cycle. As a result, charge is injected into the floating gate of the memory cell located at the interunit of the selected bit line BL and the selected word line WL, and as a result, the threshold voltage of the floating gate increases. The sense amplifier 117 detects that the threshold voltage of the memory cell to be written has reached a voltage corresponding to the data stored in the data register 116 for each cycle of the programming pulse. Depending on the detection result by the sense amplifier 117, the row decoder 119 continues applying programming pulses until the threshold voltage of the memory cell reaches a voltage corresponding to the data value to be written.

Meanwhile, in reading, the sense amplifier 117 precharges the bit line BL with a power supply potential Vcc. The row decoder 119 sequentially applies a plurality of read voltages to the selected word line WL to specify the level of the memory cell to which the data values "111", "110", "100", "000", "010", "011", "001", "101" are assigned. The value of each read voltage is a voltage value (also referred to as an optimal value) such that the error bit count of the read data is less than the error bit count that can be corrected by the ECC circuit 30 and no read error occurs. The optimal values of the read voltages depend on the threshold voltages of the memory cell in the NAND memory 40. Before shipping the memory system 12, the threshold voltages of the memory cells in the NAND memory 40 are checked, and the optimal values (that is, VA to VG) according to the threshold voltages are determined as the default values of the read voltages. Default values are included in the read voltage information 36a. The memory controller 20 transmits the default values to the NAND memory 40 and causes the NAND memory 40 to generate appropriate read voltages. The read voltage value is expressed in a conversion unit (dac) of a D/A converter in the peripheral circuit. The dac is a unit of a setting value of a circuit inside the NAND memory 40 that sets the voltage applied to the D/A converter. The D/A converter converts a digital voltage value sent from the memory controller 20 into an analog voltage.

The row decoder 119 applies a transfer potential voltage to the unselected word line WL and keeps the memory cells belonging to the unselected word line WL in a conductive state. The sense amplifier 117 determines the data value stored in a target memory cell by detecting a read voltage applied when the charge stored by precharging flows out to the source line CELSRC. A memory cell with a threshold voltage equal to or greater than the read voltage remains off even when receiving the read voltage at the control gate electrode. On the other hand, a memory cell having a threshold voltage less than the read voltage is turned on when it receives the read voltage at the control gate electrode.

As illustrated in FIG. 4, the state of a memory cell having a threshold voltage less than voltage A is determined to be at the state Er. The state of a memory cell having a threshold voltage below voltage B (and equal to or greater than voltage A) is determined to be the state A. A state of a memory cell having a threshold voltage less than a voltage between two adjacent states is determined to be the state with the lower threshold voltage of the two states.

The threshold voltage of a memory cell changes under the influence of stress such as program disturb, read disturb, or data retention.

When the amount of charge charged in the memory cell changes, the optimal values of the read voltages also change. In this case, when reading is performed using default-value read voltages determined as optimal values according to the threshold voltage distribution investigated before shipment, the error bit count may increase. When the error bit count is equal to or greater than the error bit count that can be corrected by the ECC circuit 30, the memory controller 20 detects a read error. When the memory controller 20 detects the read error, the memory controller 20 instructs the NAND memory 40 to shift the read voltage values and execute a retry read. The memory controller 20 instructs the NAND memory 40 to perform retry reads until no read errors are detected. When the error bit count is large, latency increases due to error correction and retry read, and read performance deteriorates.

When a read error is detected even after performing the retry read a certain number of times, it is determined that the read is failed, and error processing is executed.

The memory controller 20 manages default values for voltage A to voltage G, and also manages optimal values that change in response to changes in the amount of charge.

FIG. 5 is a diagram illustrating an example of the read voltage information 36a stored in the RAM 24. The read voltage information 36a includes a default value table 50 and an optimal value table 52.

FIG. 6 is a diagram illustrating an example of the default value table 50. Before shipping the memory system 12, a manufacturer examines the threshold voltage distribution for each memory cell. The voltages at the intersections of two adjacent threshold voltage distributions are set to the default values VA0 to VG0. The default value table 50 stores the default values VA0 to VG0 for the seven voltages A to G, respectively. FIG. 6 shows the default values of one memory cell. That is, a default value table 50 is provided for each of the plurality of memory cells. Alternatively, the default value table 50 may be provided in units of a plurality of memory cells.

Figure 7:
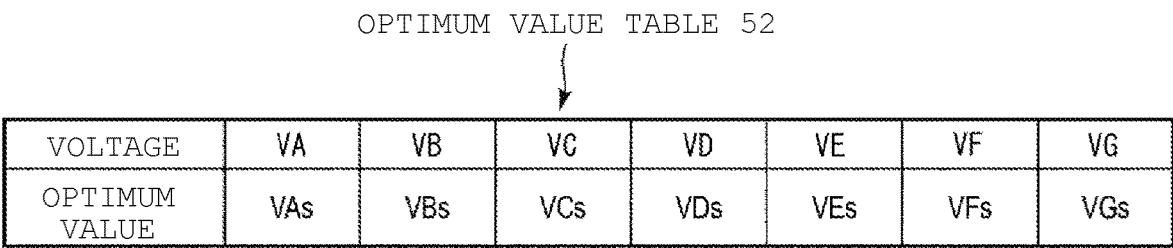
FIG. 7 is a diagram illustrating an example of an optimal value table in the read voltage information according to the embodiment.

FIG. 7 is a diagram illustrating an example of the optimal value table 52. When the amount of charge charged in the memory cell changes, the error bit count will increase when reading is performed using the default values determined before shipment. In a multilevel cell, in order to suppress the error bit count, it is important to correctly examine the optimal value of each voltage. After the memory system 12 is shipped, the optimal voltage estimation module 28a examines the threshold voltage distribution for each memory cell, and the estimator 38 estimates optimal values VAs to VGs of the read voltages for the seven voltages A to G. The optimal value table 52 stores the optimal values VAs to VGs of the seven voltages A to G. FIG. 7 shows the optimal values for one memory cell. That is, the optimal value table 52 is provided for each of the plurality of memory cells. Alternatively, the optimal value table 52 may be provided in units of a plurality of memory cells.

Figure 8:
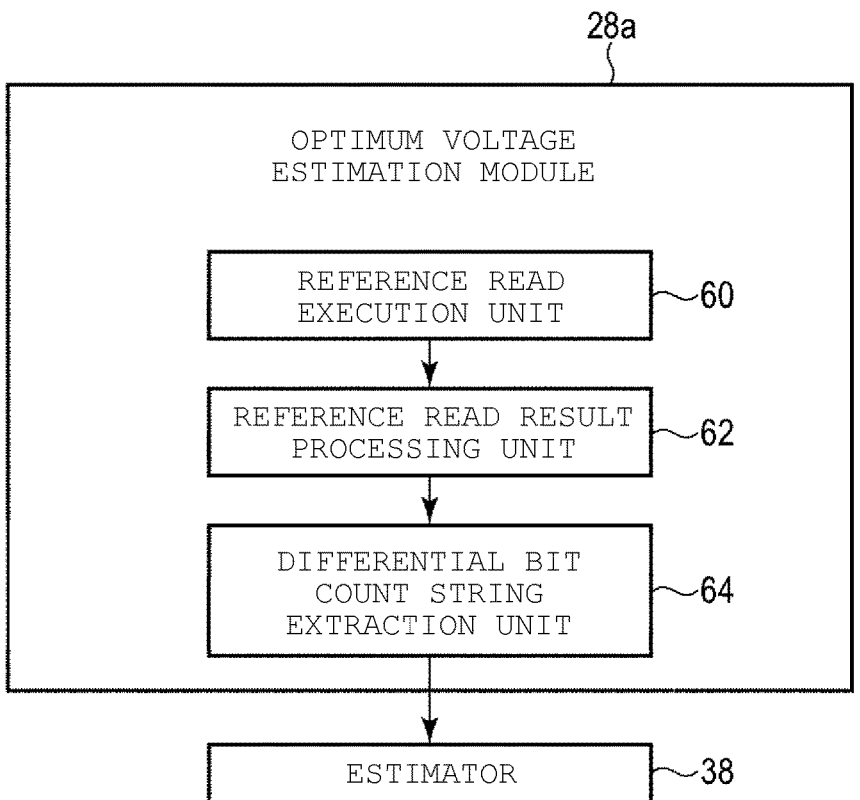
FIG. 8 is a diagram illustrating an example of a configuration of an optimal voltage estimation module according to the embodiment.

FIG. 8 is a diagram illustrating an example of the configuration of the optimal voltage estimation module 28a. The optimal voltage estimation module 28a includes a reference read execution unit 60, a reference read result processing unit 62, and a differential bit count string extraction unit 64. The output signal of the differential bit count string extraction unit 64 is input to the estimator 38. Hereinafter, the differential bit count string extraction unit 64 is also simply referred to as the extraction unit 64.

Figure 9:
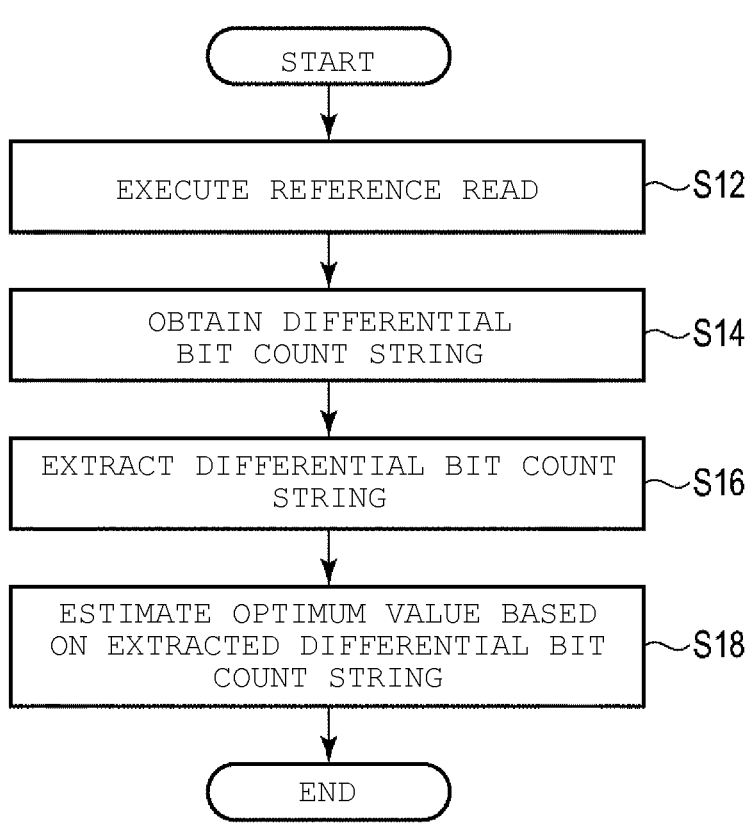
FIG. 9 is a flowchart illustrating an example of a processing of the optimal voltage estimation module according to the embodiment.

FIG. 9 is a flowchart showing an example of processing of the optimal voltage estimation module 28a. The optimal values of voltage A to voltage G, which are the read voltages of the memory cell, change over time, and the appropriate read voltages may change. The optimal voltage estimation module 28a uses the estimator 38 to estimate the optimal values of voltage A to voltage G, that is, the optimal values of the read voltages, and updates the optimal value table 52.

When the optimal value table 52 is to be updated, or when the memory system 12 receives a command from the host device 14 instructing the update of the optimal values, the reference read execution unit 60 executes the reference read (S12). Specifically, the reference read execution unit 60 applies a certain voltage to one row of memory cells and obtains a bit count. The reference read execution unit 60 changes the applied voltage and calculates the bit count again. The reference read execution unit 60 repeats the above process to obtain a plurality of bit counts for a plurality of applied voltages, that is, a bit count string. The reference read execution unit 60 writes the bit count string to the RAM 24 along with a value that specifies the applied voltage.

The voltage intervals at which the reference read is performed are set so that the reference read is performed about ten times for each state.

Figure 10:
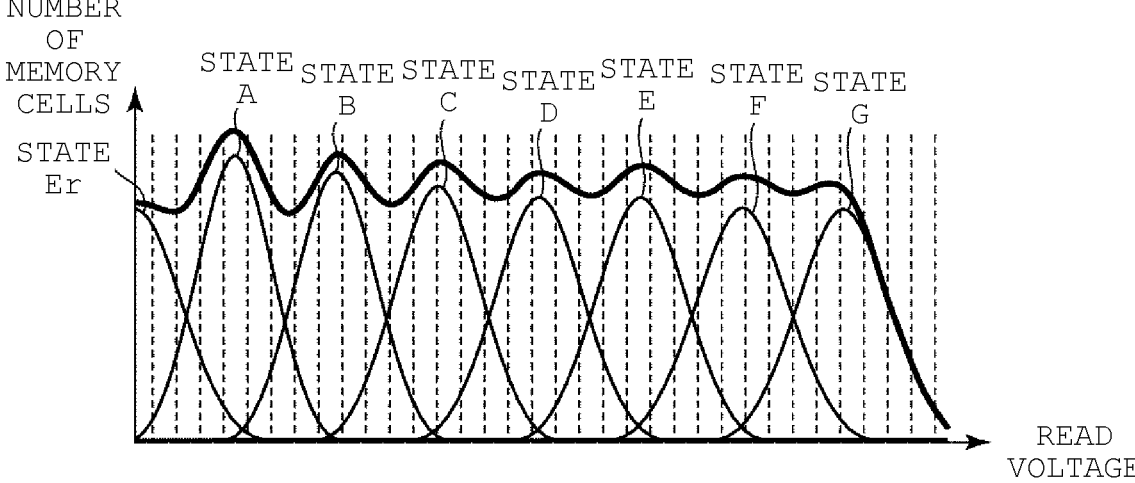
FIG. 10 is a diagram illustrating an example of a reference read according to the embodiment.

FIG. 10 is a diagram illustrating an example of a reference read. In FIG. 10, the horizontal axis represents the read voltages corresponding to the voltages applied to the memory cell in the reference read, and the vertical axis represents the number of memory cells indicating a certain bit value (data value). The read voltages on the horizontal axis in FIG. 10 corresponds to the threshold voltages on the horizontal axis in FIG. 4. The same applies to the horizontal axes in FIGS. 11 to 15. The vertical line (dashed line) indicates the voltages at which reading was performed. The thick line indicates a composite threshold voltage distribution in which the threshold voltage distributions of the states Er to G are superimposed. A voltage at a valley (minimum value) of the composite threshold voltage distribution corresponds to a state. Since the optimal voltage estimation module 28a cannot measure the threshold voltage distribution of each state, it cannot determine the valley of the composite threshold voltage distribution. However, as will be described below, the differential bit count string can be regarded as a composite threshold voltage distribution. Therefore, the optimal voltage estimation module 28a estimates the optimal values of the voltages from the differential bit count string.

Figure 11:
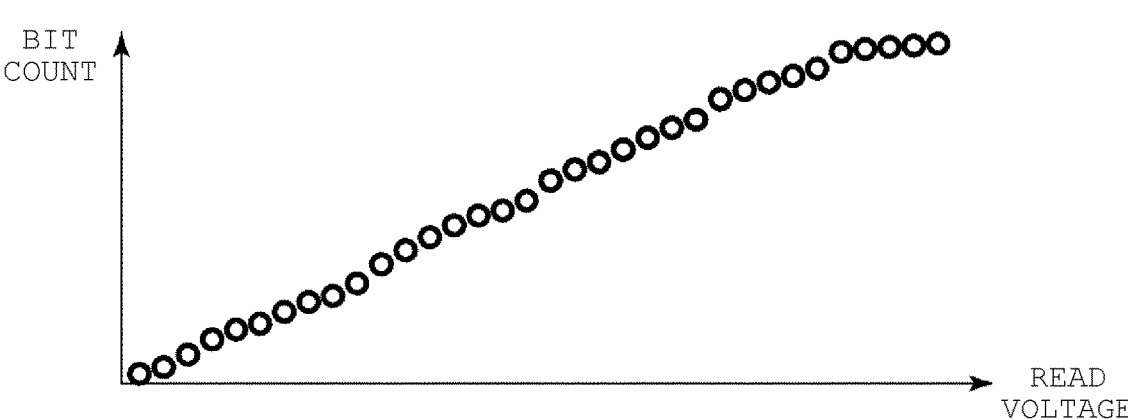
FIG. 11 is a diagram illustrating a first example of a bit count string according to the embodiment.

FIG. 11 is a diagram illustrating an example of a bit count string. The reference read execution unit 60 counts the number of memory cells that are turned on for each voltage to obtain a bit count string. When a read voltage higher than a certain voltage is applied to each memory cell, memory cells with a threshold voltage lower than this certain voltage are turned on. Therefore, as the read voltage increases, the number of memory cells that are turned on increases. In a voltage range where the threshold voltages of memory cells are concentrated and distributed, the number of memory cells that turn on as the read voltage increases is large, so the value of the differential bit count becomes large. Conversely, in a voltage range where the threshold voltages of memory cells are slightly distributed, the number of memory cells that turn on as the read voltage increases is relatively small, so the value of the differential bit count is also small. Therefore, calculating the bit count difference is effective in understanding the distribution of the threshold voltage of the memory cell. The reference read execution unit 60 transmits the bit count string to the reference read result processing unit 62.

As shown in FIG. 9, the reference read result processing unit 62 obtains a differential bit count string including the differences in each adjacent bit counts (S14). An example of how to obtain a differential bit count string is to calculate the difference between two bit counts corresponding to two adjacent voltages. The reference read result processing unit 62 calculates the differential bit count between each bit count and the nearest bit count thereto on a low voltage side. The reference read result processing unit 62 obtains a plurality of differential bit counts calculated for each bit count, that is, a differential bit count string.

Figure 12:
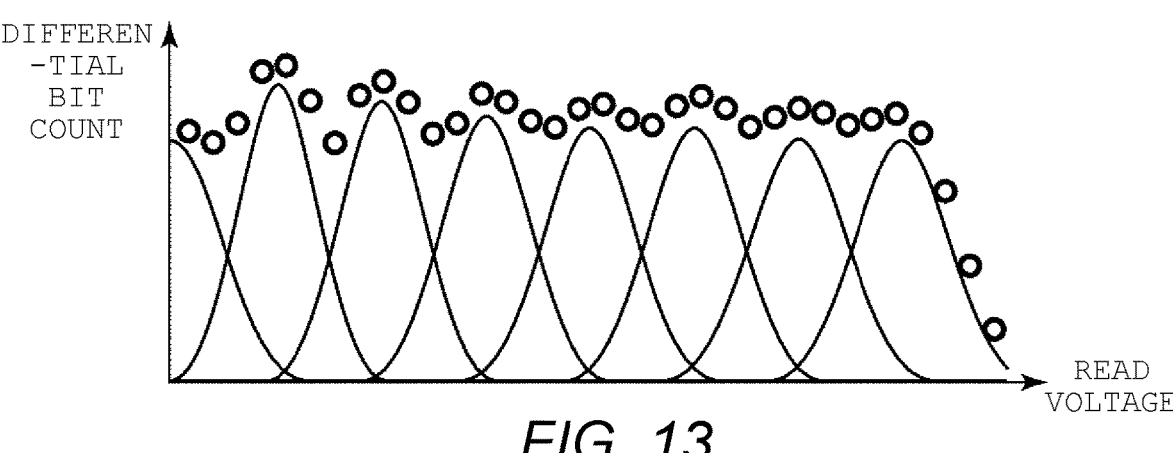
FIG. 12 is a diagram illustrating an example of a differential bit count string according to the embodiment.

FIG. 12 is a diagram illustrating an example of a differential bit count string. When the interval between voltages for performing reference read is set narrowly, the differential bit count string is approximately equal to a composite threshold voltage distribution in which the threshold voltage distributions from the state Er to the state G illustrated in FIG. 10 are superimposed. The reference read result processing unit 62 transmits the differential bit count string to the extraction unit 64.

As shown in FIG. 9, the extraction unit 64 extracts a predetermined number of differential bit counts related to the voltage to be estimated from the differential bit count string based on a magnitude relationship between the differential bit counts, or the like, and then the extraction unit 64 obtains a partial differential bit count string including the extracted differential bit counts (S16). The predetermined number is any integer equal to or greater than 1. The predetermined number may be different depending on the voltage to be estimated. For example, when estimating the optimal value of the voltage C, the predetermined number may be 3, and when estimating the optimal value of the voltage D, the predetermined number may be 4. Also, when estimating the optimal value of the voltage A or voltage G, the predetermined number may be six.

In a first example of extracting a part of the differential bit count string, the extraction unit 64 detects a peak (local maximum value) differential bit count in the differential bit count string. The extraction unit 64 extracts a part of the differential bit count (e.g., local minimum) between the differential bit counts of two adjacent peaks. The extraction unit 64 generates a partial differential bit count string including the extracted differential bit counts.

The optimal value of the voltage corresponds to the voltage of the differential bit count at the valley of the differential bit count string. Since a valley exists between adjacent peaks, the extracted part of the differential bit count string including the differential bit counts between the differential bit counts of the two peaks includes the differential bit count of the valley. When the differential bit count string (partial differential bit count string) between two peaks is input to the estimator 38, the accuracy with which the estimator 38 detects valleys increases, and the accuracy with which the optimal value of the voltage is estimated increases.

In order to detect a peak, the extraction unit 64 examines the magnitude relationship between three adjacent differential bit counts. When a differential bit count corresponding to an intermediate voltage among the voltages of the three differential bit counts is greater than a differential bit count corresponding to the lowest voltage, and is smaller than a differential bit count corresponding to the highest voltage, the extraction unit 64 sets the differential bit count corresponding to the intermediate voltage as the peak. The extraction unit 64 sequentially examines the magnitude relationship of the three differential bit counts while shifting the combination of the three differential bit counts. Thereby, the extraction unit 64 detects seven peaks in the differential bit count string.

Figure 13:
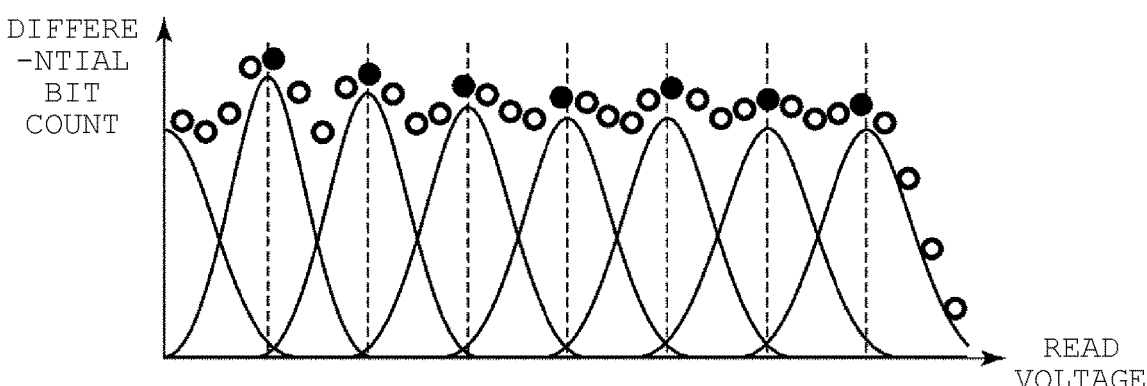
FIG. 13 is a diagram illustrating an example of extracting a part of the differential bit count string according to the embodiment.

FIG. 13 is a diagram illustrating a first example of extraction by the extraction unit 64. The extraction unit 64 detects seven peaks (indicated by black circles in FIG. 13) of the differential bit counts.

Figure 14:
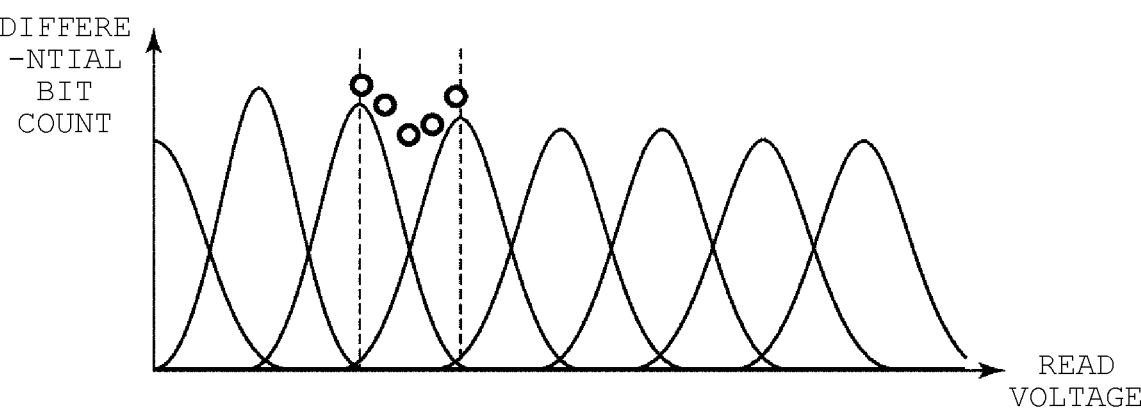
FIG. 14 is a diagram illustrating an example of an extracted part of the differential bit count string according to the embodiment.

FIG. 14 is a diagram illustrating an example of the extraction results by the extraction unit 64. When estimating the optimal value of a certain voltage, the extraction unit 64 extracts a plurality of differential bit counts located between the peak of the differential bit count corresponding to the lowest voltage on the higher voltage side than the default value of the certain voltage and the peak of the differential bit count corresponding to the highest voltage on the lower voltage side than the default value of the certain voltage. The extraction unit 64 obtains an extracted part of the differential bit count string of the certain voltage, which is including a plurality of extracted differential bit counts. The extraction unit 64 transmits seven extracted parts of the differential bit count strings regarding the seven voltages to the estimator 38.

As shown in FIG. 9, a first example of estimation by the estimator 38 is to estimate the optimal value of the voltage using only the extracted part of the differential bit count string. The estimator 38 estimates the optimal value of the certain voltage based on the extracted part of the differential bit count string regarding the certain voltage (S18).

The estimator 38 may be a deep neural network (DNN) that outputs the optimal value of the voltage corresponding to the extracted part of the differential bit count string. The DNN has a matrix calculation circuit that multiplies the extracted part of the differential bit count string by a coefficient matrix. As illustrated in FIG. 14, when the extracted part of the differential bit count string consists of five differential bit counts, the estimator 38 estimates the optimal value of the voltage by multiplying, for example, a 1×5 differential bit count string [a, b, c, d, e] by a 5×1 coefficient matrix. Coefficient matrices used for differential bit count strings of various sizes are stored in ROM 26. DNN weighting coefficients and activation functions are also stored in the ROM 26.

Figure 15:
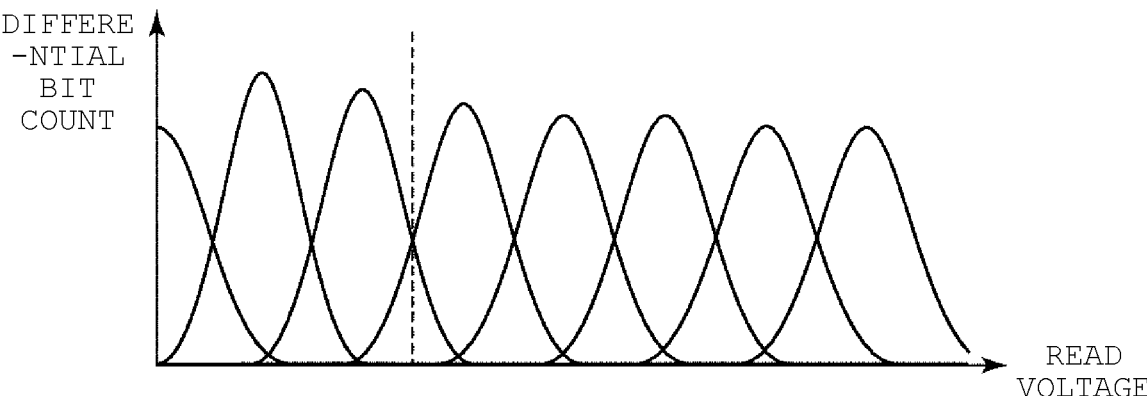
FIG. 15 is a diagram illustrating an optimal value estimated by an estimator according to the embodiment.

FIG. 15 is a diagram illustrating the optimal values of the voltages estimated by the estimator 38. The estimator 38 can determine voltages corresponding to the valleys of the differential bit count string based on a plurality of extracted parts of the differential bit count string.

(Modification of First Embodiment)

Next, a modification example of each process of an optimal voltage estimation processing according to the first embodiment will be described.

A second example of obtaining the differential bit count string will be described.

In the second example of obtaining a differential bit count string, the reference read result processing unit 62 obtains a differential bit count string according to the first example, and then applies an appropriately selected fitting method to the differential bit count string. Specifically, the reference read result processing unit 62 interpolates a new differential bit count between the measured differential bit counts.

Figures 16A, 16B, 16C, 16D:
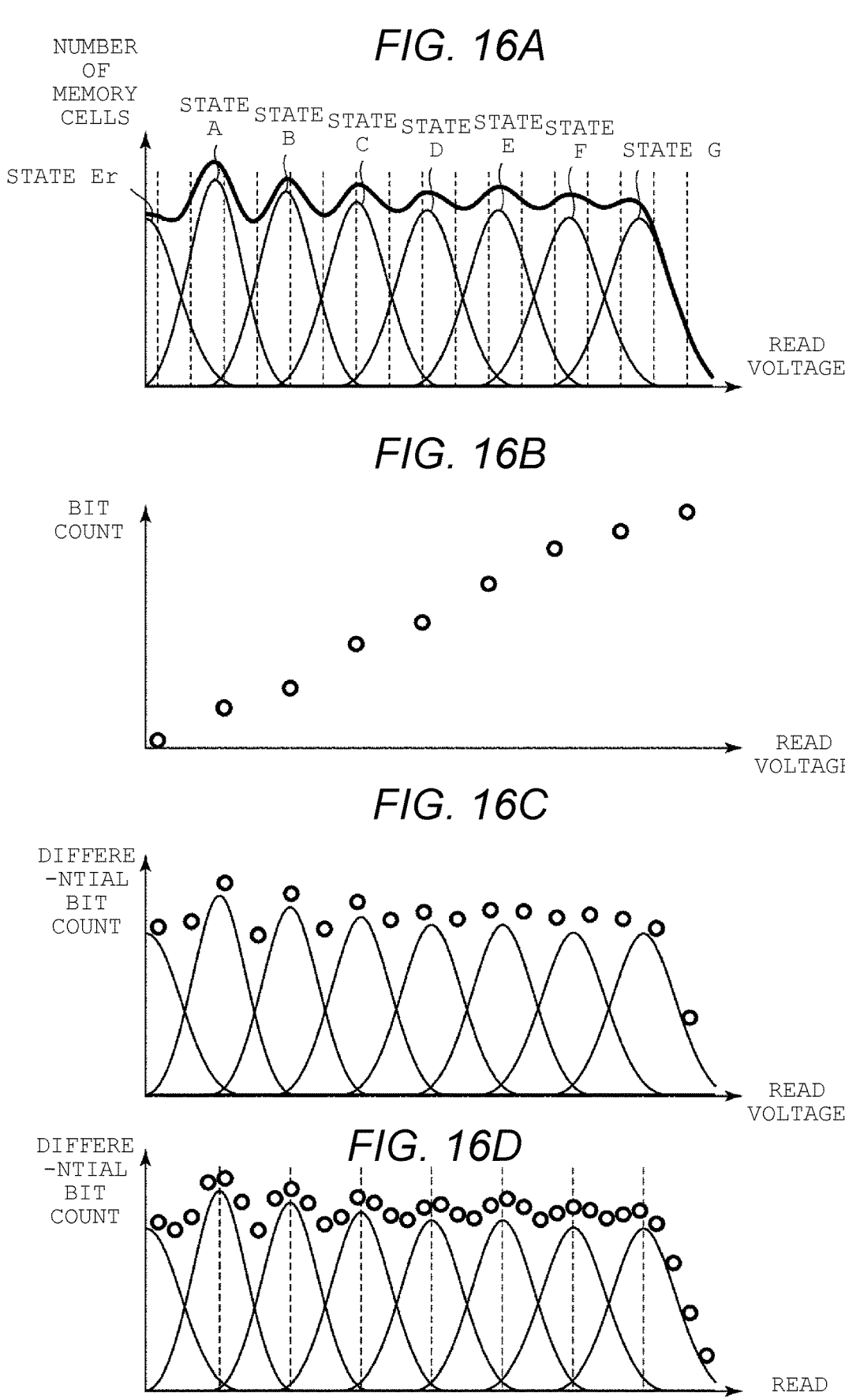
FIGS. 16A to 16D are diagrams illustrating a second example of the differential bit count string according to the embodiment.

FIGS. 16A to 16D are diagrams illustrating the second example of obtaining the differential bit count string by the reference read result processing unit 62. FIG. 16A is a diagram illustrating an example of a reference read. FIG. 16B is a diagram illustrating an example of a bit count string. FIG. 16C is a diagram illustrating an example of a differential bit count string before interpolation. FIG. 16D is a diagram illustrating an example of a differential bit count string after the interpolation. What the horizontal axes in FIGS. 16A to 16D indicate is the same as that in FIG. 10.

Here, it is assumed that candidates for applied voltages in the reference read are V0, V1, V2, V3, . . . in order from the lowest, and the reference read is performed once for each of the four applied voltage candidates. It is assumed that the voltages at which the reference read is performed are V0, V4, V8, V12, V16, . . . . That is, the voltages corresponding to the bit count string and the differential bit count string are V0, V4, V8, V12, V16, . . . . The reference read result processing unit 62 performs interpolation processing on the differential bit count string to obtain differential bit count strings corresponding to voltages V0, V2, V4, V6, V8, V10, V12, V14, V16, . . . . That is, a differential bit count string is obtained for each of the two execution voltage candidates.

When the number of voltages for performing a reference read is large, the time for performing the reference read becomes long. When the reference read result processing unit 62 operates according to the second example, the number of voltages for performing the reference read is smaller than that in the first example. The voltage interval for performing the reference read shown in FIG. 16A is longer than the voltage interval for performing the reference read shown in FIG. 10. When the voltage interval at which reference reading is performed is lengthened, the number of times reference reading is performed decreases, and the execution time becomes shorter. However, when the voltage interval at which reference reading is performed is length- ened, the interval in the bit count string shown in FIG. 16B and the interval in the differential bit count string shown in FIG. 16C also become longer, which may adversely affect the estimation accuracy of the optimal voltage.

The reference read result processing unit 62 applies an appropriately selected fitting method to the differential bit count string. More specifically, the reference read result processing unit 62 interpolates new differential bit counts between the measured differential bit counts and obtains a differential bit count string (FIG. 16D) including differential bit counts for more voltages than the voltages at which the reference read was performed. Thereby, the estimation time can be shortened without reducing the estimation accuracy.

A third example of obtaining the differential bit count string will be described. In the third example of obtaining a differential bit count string, the reference read result pro- cessing unit 62 applies an appropriately selected fitting method to the bit count string. Specifically, the reference read result processing unit 62 interpolates new bit counts between the measured bit counts and obtains a bit count string including bit counts for more voltages than the voltages at which the reference read was performed. Then, the reference read result processing unit 62 obtains a dif- ferential bit count string according to the first example or the second example and obtains a differential bit count string including differential bit counts for more voltages than the voltage at which the reference read was performed.

Figure 17A:
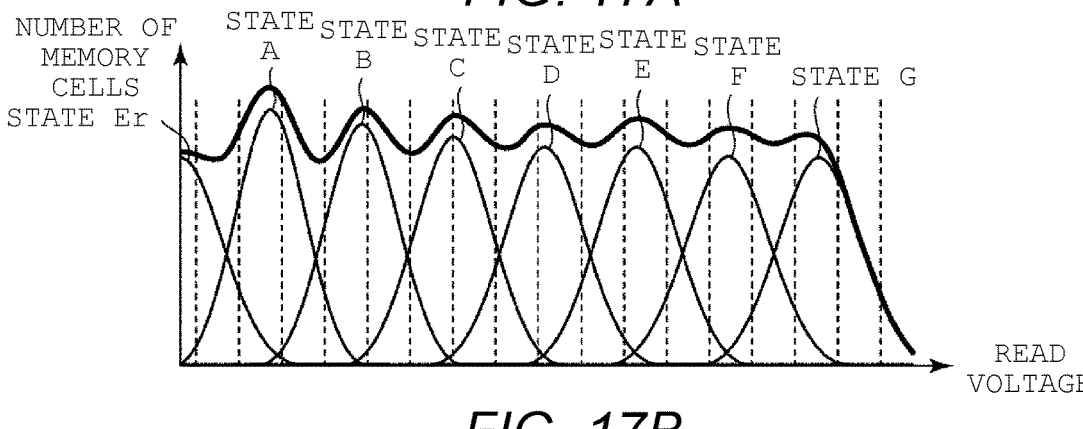
FIGS. 17A to 17D are diagrams illustrating a third example of the differential bit count string according to the embodiment.
Figure 17B:
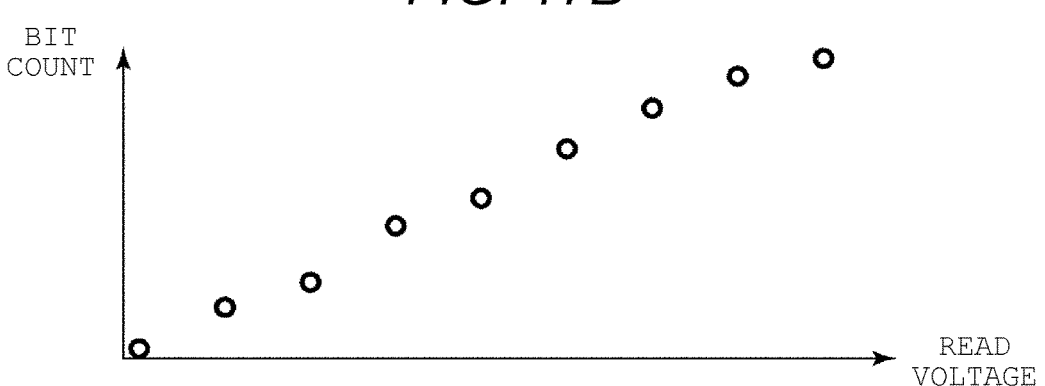
Figure 17C:
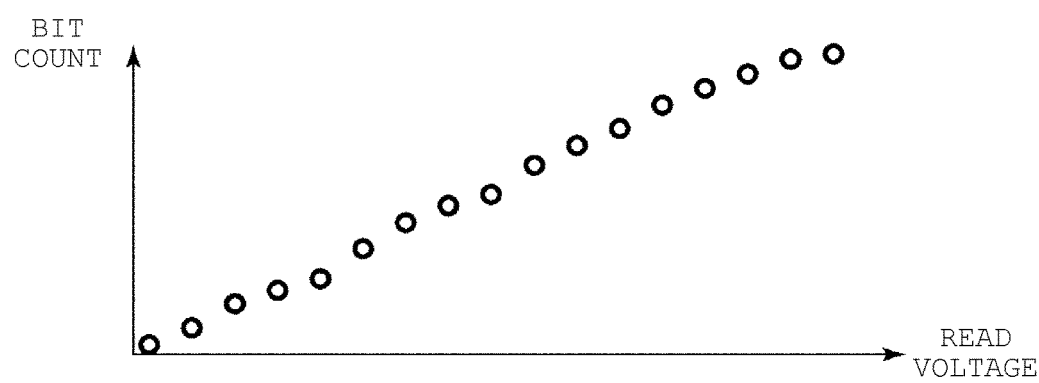
Figure 17D:
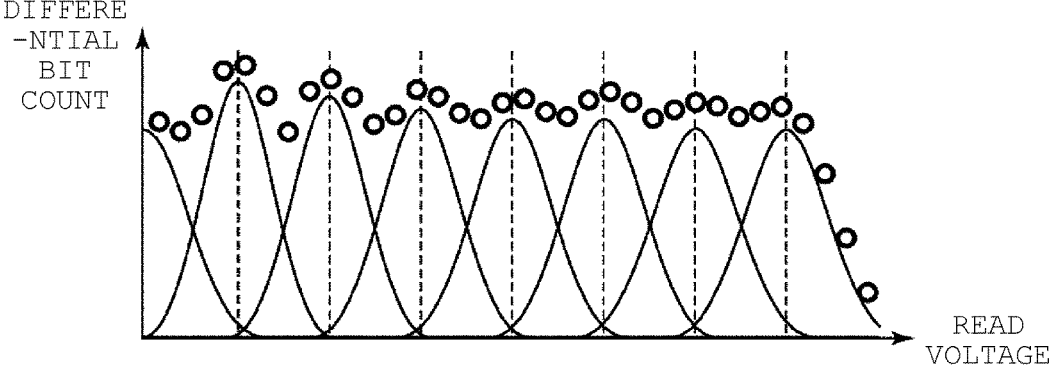

FIGS. 17A to 17D are diagrams illustrating the third example of obtaining a differential bit count string by the reference read result processing unit 62. FIG. 17A is a diagram illustrating an example of a reference read. FIG. 17B is a diagram illustrating an example of a bit count string before interpolation. FIG. 17C is a diagram illustrating an example of a bit count string after the interpolation. FIG. 17D is a diagram illustrating an example of a differential bit count string. What the horizontal axes in FIGS. 17A to 17D indicate is the same as that in FIG. 10.

The third example also allows the estimation time to be shortened without reducing the estimation accuracy.

Another example of extracting a part of the differential bit count string by the extraction unit 64 will be described. This example is performed using an estimator. The extraction unit 64 may obtain a differential bit count string including a particular number of elements from the differential bit count string using an extraction estimator similar to the estimator 38 that calculates the optimal value of the voltage from the differential bit count.

Figures 18A, 18B, 18C:
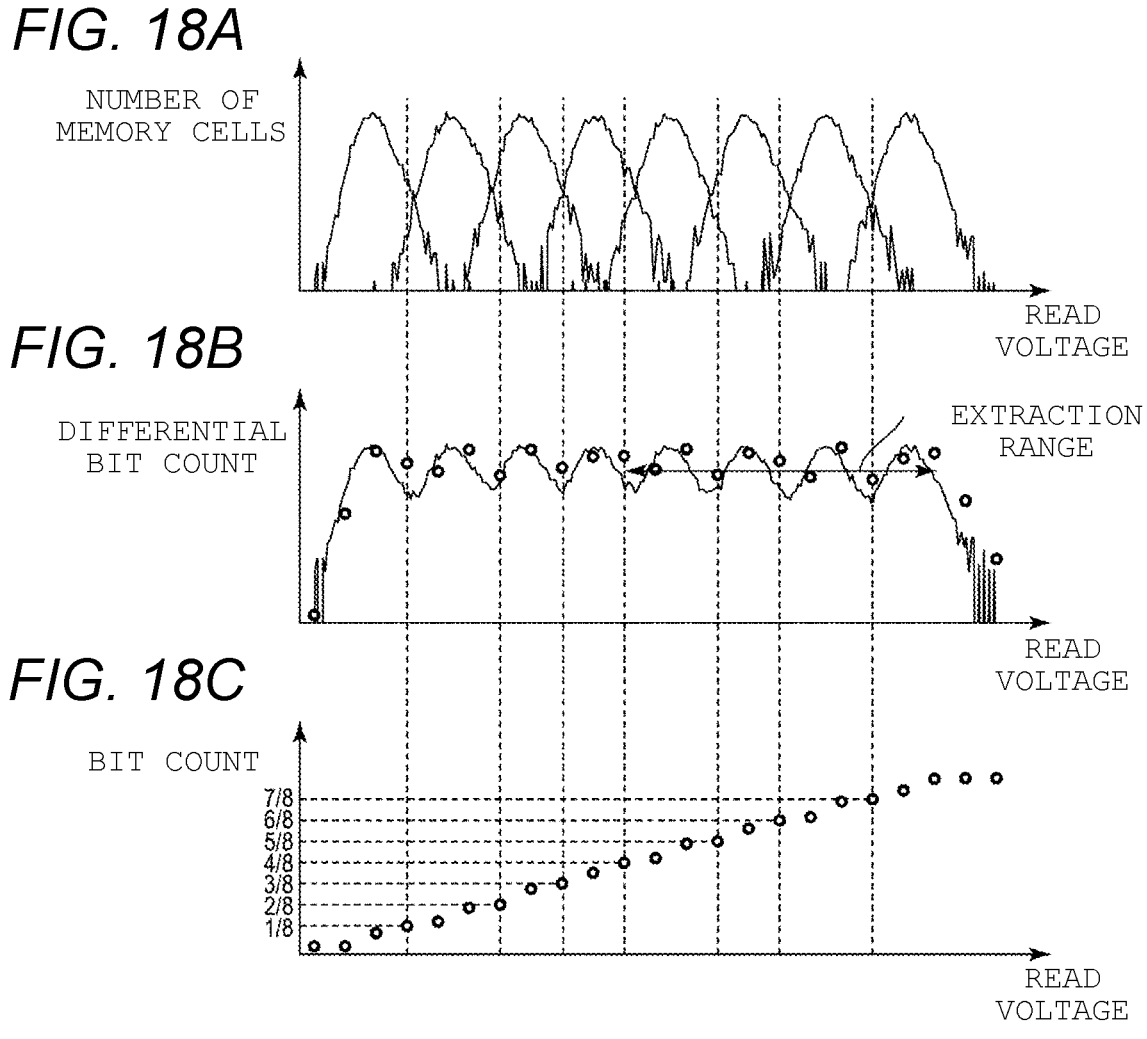
FIGS. 18A to 18C are diagrams illustrating an example of an extracted part of the differential bit count string.

FIG. 18A to 18C are diagrams illustrating this example of extracting a part of the differential bit count string. The extraction estimator determines an extraction range based on histogram information of left and right differential bit counts around a default value of a desired voltage.

FIG. 18A is a diagram illustrating an example of the threshold voltage distribution of the memory cells. FIG. 18B shows a composite threshold voltage distribution in which threshold voltage distributions of all states are superimposed and a differential bit count (circle mark). FIG. 18C is a diagram illustrating an example of a bit count string output from the reference read execution unit 60. What the hori- zontal axes in FIGS. 18A to 18C indicate is the same as that in FIG. 10. The extraction estimator calculates the bit count that is closest to each of 1/8, 2/8, 3/8, 4/8, 5/8, 6/8, and 7/8 of the total bit count (number of memory cells). In a plurality of memory cells targeted for reference read, since the number of memory cells belonging to each state is approxi- mately equal, the extraction estimator sets the seven volt- ages corresponding to these as provisional optimal values for the seven voltages. The extraction estimator selects a predetermined number of differential bit counts for each of the larger and smaller read voltage sides, centering on a provisional optimal value of one voltage. When the prede- termined number is 5, a total of 11 differential bit counts are selected. In FIG. 18C, the voltage corresponding to the bit count closest to 6/8 of the total bit count is set as the provisional optimal value of the voltage F that distinguishes the states E and F.

As described above, according to the second example, the extraction unit 64 can obtain the extracted part of the differential bit count string useful for estimating the optimal values without detecting the peaks of the differential bit count string.

Another example of estimating the optimal value of a voltage will be described. According to the second example of estimation, the extraction unit 64 inputs the partial differential bit count string to the estimator 38, and the CPU 28 also inputs specific information of the NAND memory 40 to the estimator 38. Examples of the specific information are the number of write/erase (WE) cycles of the read target unit managed by the CPU 28, lot information of the memory chip including the read target unit, coordinates of the memory chip within the wafer, and temperature.

This improves the estimation accuracy of the estimator 38.

According to the first embodiment, a bit count string for a plurality of voltages is determined, and a differential bit count string corresponding to a composite threshold voltage distribution is determined from the bit count string. A range including the valley corresponding to the voltage to be estimated in the differential bit count string is extracted, and an extracted part of the differential bit count string is obtained. Since the extracted part of the differential bit count string includes a valley corresponding to the optimal value, the optimal value of the voltage can be estimated with high accuracy based on the extracted part of the differential bit count string. That is, according to the first embodiment, read performance can be improved.

Second Embodiment

The configuration of the second embodiment is the same as the first embodiment, so detailed description will be omitted. An optimal voltage estimation process according to the second embodiment is different from the first embodi- ment. In the first embodiment, the optimal value of each voltage A to voltage G was estimated in a certain order. The accuracy of estimating the optimal value of each voltage is not uniform. The voltage that identifies the state that is greatly affected by disturbances in the threshold voltage distribution is likely to fluctuate, and the estimation accu- racy is poor. For example, the voltage A that distinguishes the states Er and A and the voltage G that distinguishes the levels F and G, that are at the end of a set of a plurality of states, are more likely to be affected by disturbances in the threshold voltage distribution, and therefore have low estimation accuracy. For example, the voltage D located in the center of the set of the plurality of states has the highest estimation accuracy. Before the memory system 12 is shipped, the accuracy of each estimation of voltage A to voltage G is checked. For example, the voltage D has the highest estimation accuracy, and the estimation accuracy decreases in the following order: voltages C, E, B, F, G, and A. Estimation order information [voltage D, voltage C, voltage E, voltage B, voltage F, voltage G, voltage A] indicating the pre-known order of estimation accuracy is stored in the ROM 26.

The estimator 38 according to the second embodiment estimates optimal voltages in the order according to the estimation order information.

Figure 19:
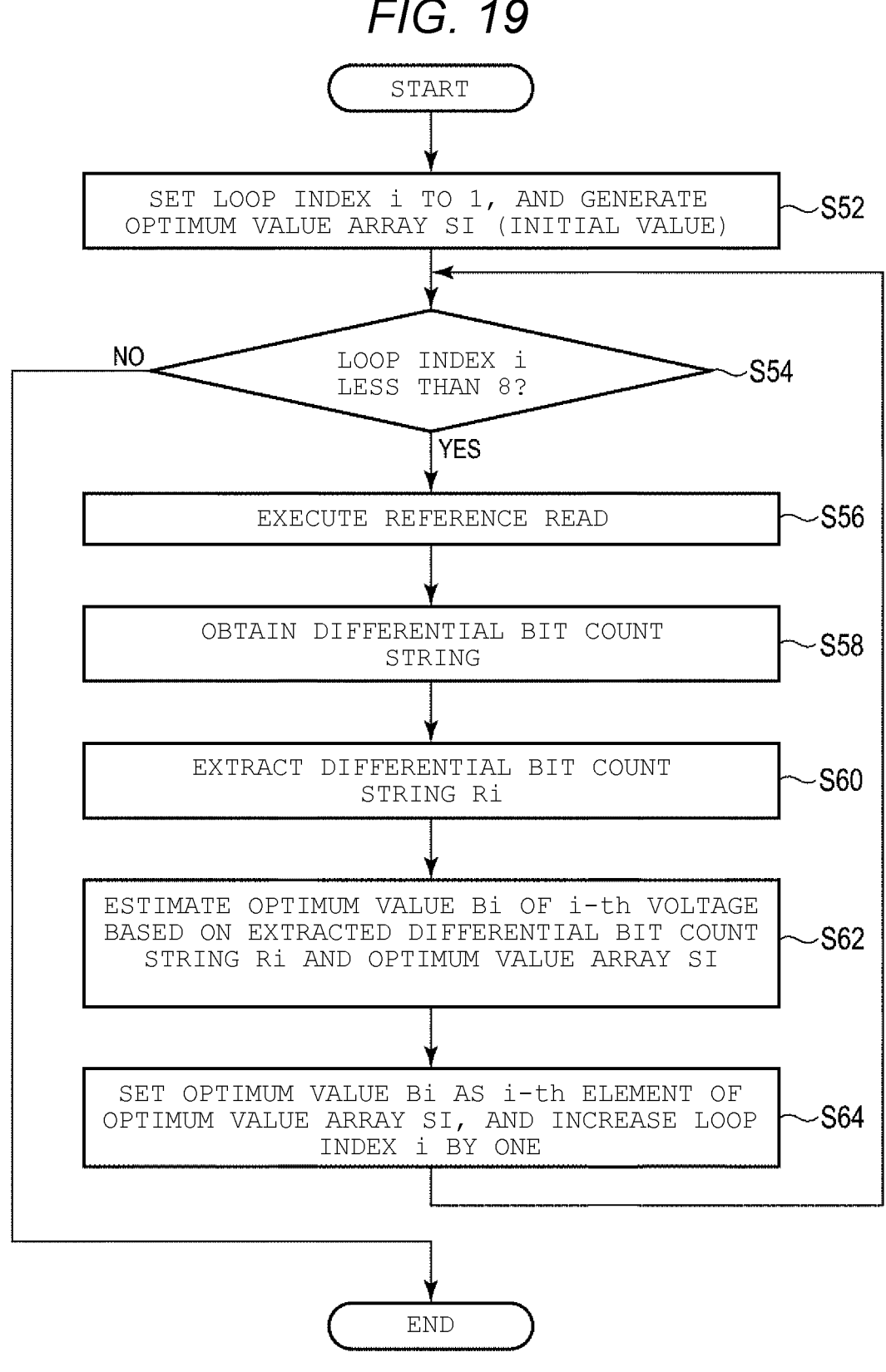
FIG. 19 is a flowchart illustrating an example of optimal voltage estimation according to a second embodiment.

FIG. 19 is a flowchart showing an example of processing of the optimal voltage estimation module 28a according to the second embodiment.

When it is time to update the optimal value table 52, or when the memory system 12 receives a command to instruct the update from the host device 14, the optimal voltage estimation module 28a sets a loop index i to 1 and generates an optimal value array SI (initial value=[0, 0, 0, 0, 0, 0, 0]) (S52). The optimal value array SI is an array of optimal values for voltages D, C, E, B, F, G, and A.

The optimal voltage estimation module 28a determines whether the loop index i is less than 8 (S54).

When the loop index i is 8 (S54: NO), the optimal voltage estimation module 28a ends its operation. When the loop index i is less than 8 (S54: YES), the optimal voltage estimation module 28a operates the reference read execution unit 60. The reference read execution unit 60 executes the reference read similarly to the first embodiment (S56).

The reference read result processing unit 62 obtains a differential bit count (S58), similarly to the first embodiment.

In order to estimate the optimal value of an i-th voltage of the estimated order information, the extraction unit 64 extracts differential bit counts of a predetermined number n (n is a positive integer of 1 or more) from the differential bit count string and obtains a partial differential bit count string Ri=(r1, r2, . . . , rn) including the extracted differential bit counts (S60).

The estimator 38 estimates an optimal value Bi of the i-th voltage based on the partial differential bit count string Ri and the optimal value array SI, as in the first embodiment (S62).

The optimal voltage estimation module 28a sets the optimal value Bi estimated by the estimator 38 as the i-th element of the optimal value array SI, updates the optimal value array SI, and increases the loop index i by one (S64).

Then, the optimal voltage estimation module 28a determines whether the loop index i is less than 8 (S54).

Figure 20:
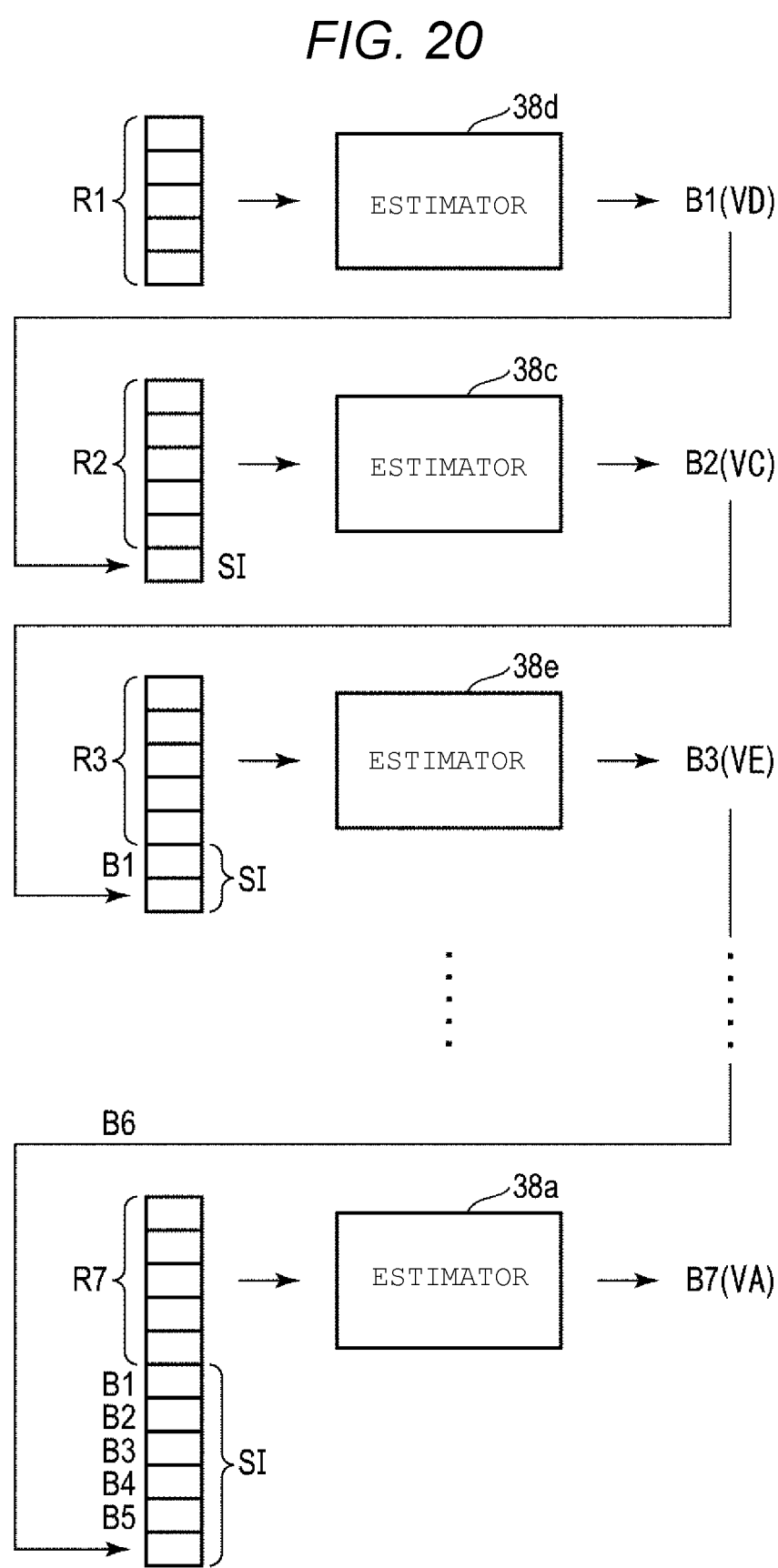
FIG. 20 is a diagram illustrating a first application example of optimal voltage estimation according to the second embodiment.

FIG. 20 is a diagram illustrating a first example of the operation according to the flowchart of FIG. 19. For convenience of illustration, it is assumed that the partial differential bit count string has five differential bit counts. It is assumed that the estimator 38 is provided for each voltage to be estimated.

First, the optimal value of the voltage D is estimated. The optimal voltage estimation module 28a inputs the partial differential bit count string R1 for voltage D estimation to an estimator 38d for the voltage D. The estimator 38d determines an optimal value B1 of the voltage D based on the partial differential bit count string R1 (5 differential bit counts). The estimator 38d sends the optimal value B1 of the voltage D to the optimal voltage estimation module 28a. The optimal voltage estimation module 28a writes the optimal value B1 of the voltage D to the optimal value array SI (SI=[B1, 0, 0, 0, 0, 0, 0]).

Next, the optimal value of the voltage C is estimated. The optimal voltage estimation module 28a inputs the partial differential bit count string R2 and optimal value array SI (=[B1, 0, 0, 0, 0, 0, 0]) for voltage C estimation to an estimator 38c for the voltage C. The estimator 38c determines an optimal value B2 of the voltage C based on six input data of the partial differential bit count string R2 and the optimal value B1 of the voltage D. The estimator 38c sends the optimal value B2 of the voltage C to the optimal voltage estimation module 28a. The optimal voltage estimation module 28a writes the optimal value B2 of the voltage C to the optimal value array SI (SI=[B1, B2, 0, 0, 0, 0, 0]).

Next, the optimal value of the voltage E is estimated. The optimal voltage estimation module 28a inputs a partial differential bit count string R3 and the optimal value array SI (=[B1, B2, 0, 0, 0, 0, 0]) for voltage E estimation to an estimator 38e for the voltage E. The estimator 38e determines an optimal value B3 of the voltage E based on seven input data of the partial differential bit count string R3, the optimal value B1 of the voltage D, and optimal value B2 of the voltage C. The estimator 38c sends the optimal value B3 of the voltage E to the optimal voltage estimation module 28a. The optimal voltage estimation module 28a writes the optimal value B3 of the voltage E to the optimal value array SI (SI=[B1, B2, B3, 0, 0, 0, 0]). Thereafter, optimal values for the voltages B, F, and G are determined in the same way. When an optimal value B6 of the voltage G is determined, the optimal value array SI becomes [B1, B2, B3, B4, B5, B6, 0].

Finally, the optimal value of the voltage A is estimated. The optimal voltage estimation module 28a inputs a partial differential bit count string R7 and optimal value array SI (=[B1, B2, B3, B4, B5, B6, 0]) for voltage A estimation to an estimator 38a for the voltage A. The estimator 38a determines an optimal value B7 for the voltage A based on eleven input data: the partial differential bit count string R7, optimal value B1 for voltage D, optimal value B2 for voltage C, optimal value B3 for voltage E, optimal value B4 for voltage B, optimal value B5 for voltage F, and optimal value B6 for voltage G.

The order of estimating the optimal value of the voltage is the order of estimation accuracy. All the optimal values of the voltage that have already been estimated are input to the estimator 38 of each voltage. The number of input data to the estimator 38 increases as the voltage estimation accuracy decreases. Therefore, the estimator 38 can also accurately estimate the voltage that identifies the level at which the influence of disturbance in the threshold voltage distribution is large.

Figure 21:
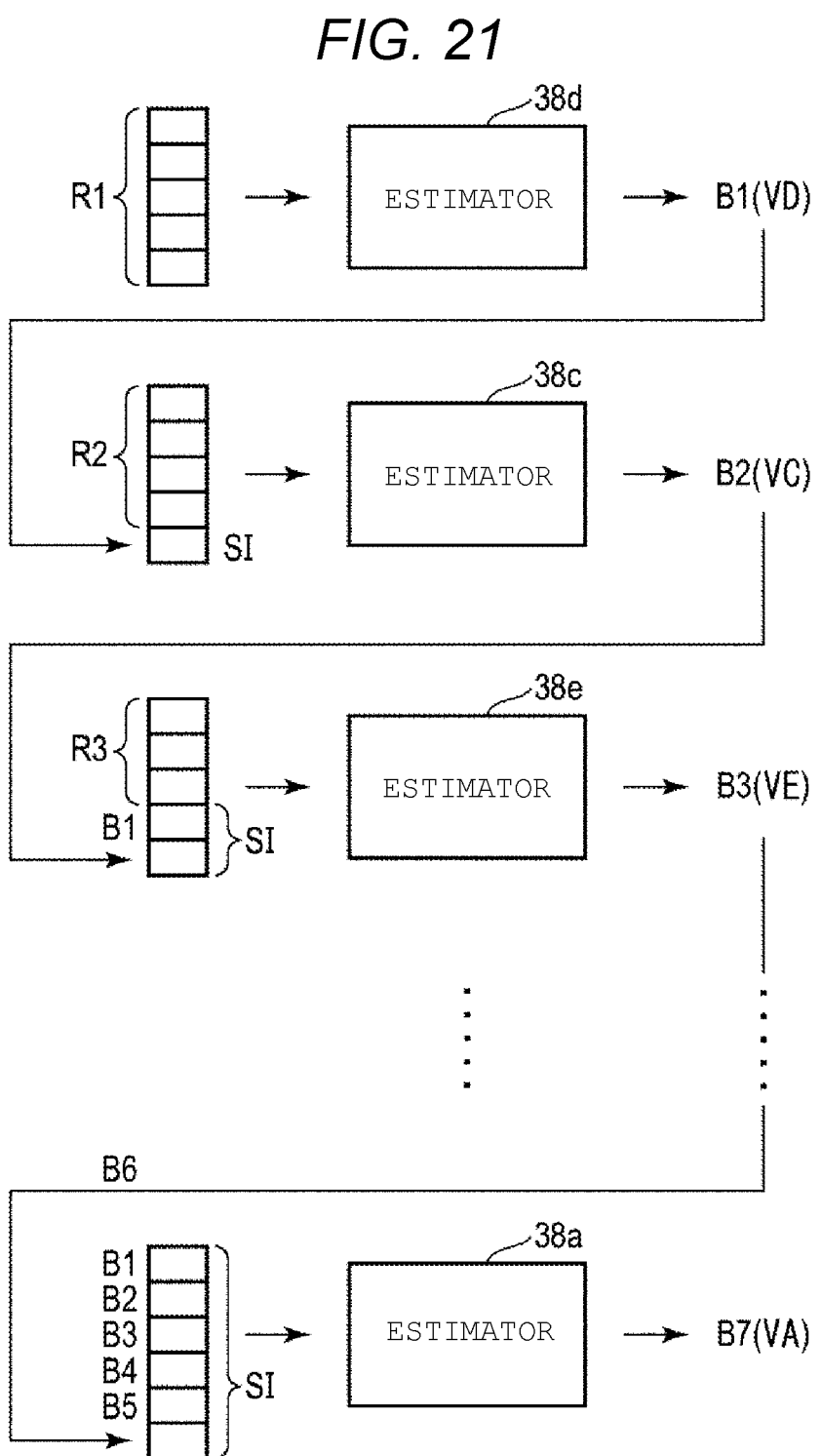
FIG. 21 is a diagram illustrating a second application example of optimal voltage estimation according to the second embodiment.

FIG. 21 is a diagram illustrating a second example of the operation according to the flowchart of FIG. 19. In the first example (FIG. 20), all the already estimated optimal values of the voltages are input to the estimator 38 of each voltage. A partial differential bit count string including the same number (five in the example of FIG. 20) of differential bit counts is also input to the estimator 38 of each voltage. Therefore, the number of data input to the estimator 38 of each voltage increases by one as the number of optimal values written to the optimal value array SI increases. In the second example, even when the number of optimal values written to the optimal value array SI increases, the number of data input to the estimator 38 does not increase.

In the second example, first, the optimal value of the voltage D is estimated in the same manner as in the first example shown in FIG. 20. The optimal voltage estimation module 28a writes the optimal value B1 of the voltage D to the optimal value array SI (SI=[B1, 0, 0, 0, 0, 0, 0]).

Next, the optimal value of the voltage C is estimated. The optimal voltage estimation module 28a inputs a partial differential bit count string R2 and the optimal value array SI (=[B1, 0, 0, 0, 0, 0, 0]) for the voltage C estimation to the estimator 38c for the voltage C. The optimal voltage estimation module 28a decreases the number of differential bit counts of the partial differential bit count string for voltage estimation as the number of optimal values of the optimal value array SI increases. The number of differential bit counts of the partial differential bit count string R2 for the voltage C estimation is four, which is one less than the number of differential bit counts of the partial differential bit count string R1 for the voltage D estimation. The estimator 38c determines an optimal value B2 of the voltage C based on five input data of the partial differential bit count string R2 and the optimal value B1 of the voltage D. The estimator 38c sends the optimal value B2 of the voltage C to the optimal voltage estimation module 28a. The optimal voltage estimation module 28a writes the optimal value B2 of the voltage C to the optimal value array SI (SI=[B1, B2, 0, 0, 0, 0, 0]).

Next, the optimal value of the voltage E is estimated. The optimal voltage estimation module 28a inputs a partial differential bit count string R3 and the optimal value array SI (=[B1, B2, 0, 0, 0, 0, 0]) for the voltage E estimation to the estimator 38e for the voltage E. The number of differential bit counts of the partial differential bit count string R3 for voltage E estimation is three. The estimator 38e determines an optimal value B3 of the voltage E based on five input data of the partial differential bit count string R3, the optimal value B1 of the voltage D, and the optimal value B2 of the voltage C. The estimator 38e sends the optimal value B3 of the voltage E to the optimal voltage estimation module 28a. The optimal voltage estimation module 28a writes the optimal value B3 of the voltage E to the optimal value array SI (SI=[B1, B2, B3, 0, 0, 0, 0]).

Thereafter, optimal values for the voltages B, F, and G are determined in the same way. When an optimal value B6 of the voltage G is determined, the optimal value array SI becomes [B1, B2, B3, B4, B5, B6, 0].

Finally, the optimal value of the voltage A is estimated. The optimal voltage estimation module 28a inputs the optimal value array SI (=[B1, B2, B3, B4, B5, B6, 0]) to the estimator 38a for the voltage A. The optimal voltage estimation module 28a creates no partial differential bit count string for voltage E estimation. The estimator 38a determines an optimal value B7 of the voltage A based on six input data of the optimal value B1 of the voltage D, the optimal value B2 of the voltage C, the optimal value B3 of the voltage E, the optimal value B4 of the voltage B, the optimal value B5 of the voltage F, and the optimal value B6 of the voltage G.

In the second example, the optimal voltage estimation module 28a decreases the number of differential bit counts of the partial differential bit count string when the number of optimal values of the optimal value array SI increases. Therefore, even when the number of voltages to be estimated increases, the number of inputs to the estimator 38 does not increase. Although six optimal values are input to the estimator 38a, the configuration may be such that the first estimated optimal value B1 of the voltage D is not input and the five optimal values are always input.

Figure 22:
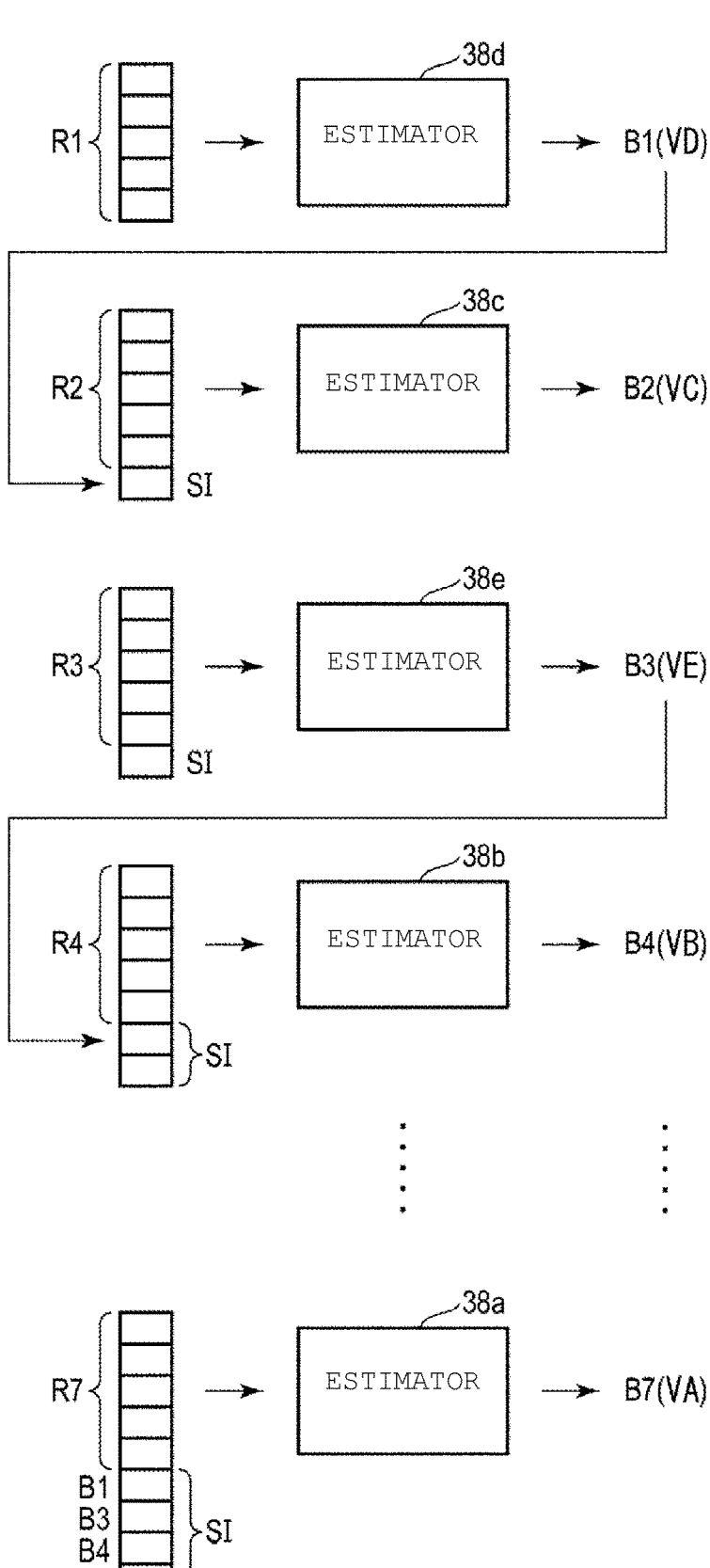
FIG. 22 is a diagram illustrating a third application example of optimal voltage estimation according to the second embodiment.

FIG. 22 is a diagram illustrating a third example of the operation according to the flowchart of FIG. 19. In the first example (FIG. 20), all the already estimated optimal values of the voltages are input to the estimator 38 of each voltage. In the third example, the already estimated optimal value of the voltage is not necessarily used for subsequent estimation. In the third example, the number of differential bit counts of the partial differential bit count string input to each estimator 38 is constant, but it may be decreased as the number of estimated voltages increases as in the second example.

First, the optimal value of the voltage D is estimated in the same manner as in the first example shown in FIG. 20. The optimal voltage estimation module 28a writes the optimal value B1 of the voltage D to the optimal value array SI (SI=[B1, 0, 0, 0, 0, 0, 0]).

Next, the optimal value of the voltage C is estimated. The optimal voltage estimation module 28a inputs a partial differential bit count string R2 and the optimal value array SI (=[B1, 0, 0, 0, 0, 0, 0]) for the voltage C estimation to the estimator 38c for the voltage C. The estimator 38c determines an optimal value B2 of the voltage C based on six input data of the partial differential bit count string R2 and the optimal value B1 of the voltage D. The estimator 38c sends the optimal value B2 of the voltage C to the optimal voltage estimation module 28a. The optimal voltage estimation module 28a does not write the optimal value B2 of the voltage C to the optimal value array SI (SI=[B1, 0, 0, 0, 0, 0, 0]).

Next, the optimal value of the voltage E is estimated. The optimal voltage estimation module 28a inputs a partial differential bit count string R3 and the optimal value array SI (=[B1, 0, 0, 0, 0, 0, 0]) for the voltage E estimation to the estimator 38e for the voltage E. The estimator 38e determines an optimal value B3 of the voltage E based on six input data of the partial differential bit count string R3 and the optimal value B1 of voltage D. The estimator 38c sends the optimal value B3 of the voltage E to the optimal voltage estimation module 28a. The optimal voltage estimation module 28a writes the optimal value B3 of the voltage E to the optimal value array SI (SI=[B1, 0, B3, 0, 0, 0, 0]).

Thereafter, optimal values for the voltages B, F, and G are determined in the same way. Some or all of optimal values S4, S5, and S6 of the voltages B, F, and G are written to the optimal value array SI. After an optimal value B6 of the voltage G is determined, it is assumed that the optimal value array SI is [B1, 0, B3, B4, B5, 0, 0].

Finally, the optimal value of the voltage A is estimated. The optimal voltage estimation module 28a inputs a partial differential bit count string R7 and the optimal value array SI (=[B1, 0, B3, B4, B5, 0, 0]) for the voltage A estimation to the estimator 38a for the voltage A. The estimator 38a determines the optimal value B7 of the voltage A based on nine input data of the partial differential bit count string R7, the optimal value B1 of the voltage D, the optimal value B3 of the voltage E, the optimal value B4 of the voltage B, and the optimal value B5 of the voltage F.

As described above, according to the second embodiment, since the estimator 38 estimates the optimal value based on the already estimated optimal value of the voltage in addition to or instead of the partial differential bit count string, the optimal value of the voltage can be estimated with high accuracy.

The modification example of the first embodiment is also applicable to the second embodiment. For example, the modification examples shown in FIGS. 16A to 18C are also applicable to the second embodiment.

The present disclosure is not limited to the above-described embodiments as they are but can be implemented by modifying the components within the scope of the present disclosure at the implementation stage. Furthermore, various embodiments can be created by appropriately combining the plurality of components disclosed in the above embodiments. For example, some components may be deleted from all the components shown in the embodiments. Also, components of different embodiments may be combined as appropriate.

While certain embodiments have been described, these embodiments have been presented by way of example only, and are not intended to limit the scope of the disclosure. Indeed, the novel embodiments described herein may be embodied in a variety of other forms; furthermore, various omissions, substitutions, and changes in the form of the embodiments described herein may be made without departing from the spirit of the disclosure. The accompanying claims and their equivalents are intended to cover such forms or modifications as would fall within the scope and spirit of the disclosure.

What is claimed is:

1. A memory system comprising:

a nonvolatile memory including one or more memory chips, each of which includes a plurality of memory cells; and a controller including a processor, an error correction circuit, and a volatile memory, the processor being configured to:

perform a first read operation to determine a value of multi-bit data stored in each of the memory cells by reading a first plurality of read voltages from a first memory chip of the one or more memory chips, storing the read first plurality of read voltages in the volatile memory, and using the first plurality of read voltages stored in the volatile memory;

perform a first error detection and correction of data read through the first read operation;

after the first read operation, control the error correction circuit to perform an estimation of optimum values of the first plurality of read voltages by:

applying a second plurality of read voltages to the plurality of memory cells and obtaining a first string of bit counts, wherein the number of read voltages in the second plurality is greater than the number of read voltages in the first plurality and each of the bit counts indicates a number of memory cells that are turned on when a corresponding one of the read voltages in the second plurality is applied to the plurality of memory cells;

obtaining a second string of differential bit counts, each of which indicates a difference between adjacent bit counts in the first string of bit counts;

extracting a part of the differential bit counts from the second string;

estimating the optimum values of the first plurality of read voltages using the extracted differential bit counts; and updating the first plurality of read voltages stored in the first memory chip to the estimated optimum values;

perform a second read operation using the optimum values of the first plurality of read voltages that are stored in the first memory chip by said updating; and control the error correction circuit to perform a second error detection and correction of data read through the second read operation.

2. The memory system according to claim 1, wherein the controller is configured to, during the estimation of the optimum values of the first plurality of read voltages, determine a part of the differential bit counts of the second string corresponding to local maximums;

determine middle voltage values of voltage values corresponding to the local maximums; and use the middle voltage values as at least a part of the estimated optimum values of the first plurality of read voltages.

3. The memory system according to claim 1, wherein the controller is configured to, during the estimation of the optimum values of the first plurality of read voltages, extract a part of the differential bit counts of the second string corresponding to local minimums; and use voltage values corresponding to the local minimums as at least a part of the estimated optimum values of the first plurality of read voltages.

4. The memory system according to claim 1, wherein the controller is configured to, during the estimation of the optimum values of the first plurality of read voltages, interpolate the second string of differential bit counts, wherein the extraction is performed with respect to the interpolated second string of differential bit counts.

5. The memory system according to claim 1, wherein the controller is configured to, during the estimation of the optimum value of the first plurality of read voltages, interpolate the first string of bit counts, wherein the second string of differential bit counts is obtained from the interpolated first string of bit counts.

6. The memory system according to claim 1, wherein the controller is configured to, during the estimation of the optimum values of the first plurality of read voltages, extract different parts of the differential bit counts of the second string for estimating the optimum values of the first plurality of read voltages, respectively.

7. The memory system according to claim 6, wherein the controller includes a matrix calculation circuit configured to multiply a coefficient matrix to an input matrix, and the controller is configured to, during the estimation of the optimum values of the first plurality of read voltages, input extracted differential bit counts of the second string corresponding to one of the first plurality of read voltages into the matrix calculation circuit as the input matrix; and use a value output from the matrix calculation circuit for an optimum value of the one of the first plurality of read voltages.

8. The memory system according to claim 6, wherein the controller is configured to, during the estimation of the optimum values of the first plurality of read voltages, estimate the optimum values of the first plurality of read voltages one by one in an order of a pre-known estimation accuracy.

9. The memory system according to claim 8, wherein the controller is configured to, estimate an initial one of the optimum values using a first part of the differential bit counts of the second string; and then estimate a second one of the optimum values using a second part of the differential bit counts of the second string and the initial one of the optimum values.

10. The memory system according to claim 9, wherein the controller is configured to, estimate a third one of the optimum values using a third part of the differential bit counts of the second string, the initial one of the optimum values, and the second one of the optimum values.

11. The memory system according to claim 10, wherein the controller is configured to, estimate a last one of the optimum values using a part of the differential bit counts of the second string and all estimated optimum values of the first plurality of read voltages that have been obtained by then.

12. The memory system according to claim 9, wherein the second part of the differential bit counts of the second string has a fewer number than the first part of the differential bit counts of the second string.

13. The memory system according to claim 12, wherein the controller is configured to, estimate a last one of the optimum values using no part of the differential bit counts of the second string and all estimated optimum values of the first plurality of read voltages that have been obtained by then.

14. The memory system according to claim 9, wherein the controller is configured to, estimate a third one of the optimum values using a third part of the differential bit counts of the second string, and any one and not both of the initial one of the optimum values and the second one of the optimum values.

15. A method of controlling a memory system comprising a nonvolatile memory including one or more memory chips, each of which includes a plurality of memory cells, a volatile memory, and an error correction circuit, the method comprising:

performing a first read operation to determine a value of multi-bit data stored in each of the memory cells by reading a first plurality of read voltages from a first memory chip of the one or more memory chips, storing the read first plurality of read voltages in the volatile memory, and using the first plurality of read voltages stored in the volatile memory;

controlling the error correction circuit to perform a first error detection and correction of data read through the first read operation;

after the first read operation, performing an estimation of optimum values of the first plurality of read voltages by:

applying a second plurality of read voltages to the plurality of memory cells and obtaining a first string of bit counts, wherein the number of read voltages in the second plurality is greater than the number of read voltages in the first plurality and each of the but counts indicates a number of memory cells that are turned on when a corresponding one of the read voltages in the second plurality is applied to the plurality of memory cells;

obtaining a second string of differential bit counts, each of which indicates a difference between adjacent bit counts in the first string of bit counts;

extracting a part of the differential bit counts from the second string;

estimating the optimum values of the first plurality of read voltages using the extracted differential bit counts; and updating the first plurality of read voltages stored in the first memory chip to the estimated optimum values;

performing a second read operation using the optimum values of the first plurality of read voltages that are stored in the first memory chip by said updating; and controlling the error correction circuit to a second error detection and correction of data read through the second read operation.

16. The method according to claim 15, wherein the part of the differential bit counts of the second string extracted corresponding to local maximums, and the estimation of the optimum values of the first plurality of read voltages further includes:

determining middle voltage values of voltage values corresponding to the local maximums; and using the middle voltage values as at least a part of the estimated optimum values of the first plurality of read voltages.

17. The method according to claim 15, wherein the part of the differential bit counts of the second string extracted corresponding to local minimums, and the estimation of the optimum values of the read voltages further includes:

using voltage values corresponding to the local minimums as at least a part of the estimated optimum values of the read voltages.

18. The method according to claim 15, wherein the estimation of the optimum values of the first plurality of read voltages further includes:

interpolating the second string of differential bit counts, wherein said extracting is performed with respect to the interpolated second string of differential bit counts.

19. The method according to claim 15, wherein the estimation of the optimum values of the first plurality of read voltages further includes:

interpolating the first string of bit counts, wherein the second string of differential bit counts is obtained from the interpolated first string of bit counts.

20. The method according to claim 15, wherein different parts of the differential bit counts of the second string are extracted for estimating the optimum values of the first plurality of read voltages, respectively.

* * * * *